United States Patent
Ebbesen et al.

(10) Patent No.: US 6,236,033 B1
(45) Date of Patent: May 22, 2001

(54) ENHANCED OPTICAL TRANSMISSION APPARATUS UTILIZING METAL FILMS HAVING APERTURES AND PERIODIC SURFACE TOPOGRAPHY

(75) Inventors: Thomas W. Ebbesen, Plainsboro; Daniel E. Grupp, Stockton; Tineke Thio, Princeton, all of NJ (US); Henri J. Lezec, Strasbourg (FR)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/208,116

(22) Filed: Dec. 9, 1998

(51) Int. Cl.[7] ........................................ H01J 3/14
(52) U.S. Cl. ............................. 250/216; 250/234
(58) Field of Search .................... 250/216, 201.3, 250/306–311, 208.1; 356/376

(56) References Cited

U.S. PATENT DOCUMENTS

| | | |
|---|---|---|
| 3,866,037 | 2/1975 | Simpson . |
| 4,360,273 | 11/1982 | Thaxter . |
| 4,405,238 | 9/1983 | Grobman et al. . |
| 4,411,013 | 10/1983 | Takasu et al. . |
| 4,556,790 | 12/1985 | Glass et al. . |
| 4,659,429 | 4/1987 | Isaacson et al. . |
| 4,662,747 | 5/1987 | Isaacson et al. . |
| 4,815,854 | 3/1989 | Tanaka et al. . |
| 4,891,830 | 1/1990 | Iwahashi . |
| 5,250,812 | 10/1993 | Murai et al. . |
| 5,306,902 | 4/1994 | Goodman . |
| 5,351,127 | 9/1994 | King et al. . |
| 5,354,985 | 10/1994 | Quate . |
| 5,451,980 | 9/1995 | Simon et al. . |
| 5,570,139 | 10/1996 | Wang . |
| 5,633,972 | 5/1997 | Walt et al. . |
| 5,663,798 | 9/1997 | Karrai . |
| 5,789,742 | 8/1998 | Wolff . |
| 5,933,233 | 8/1999 | Gunther . |
| 5,973,316 | 10/1999 | Ebbesen et al. . |
| 6,040,936 | 3/2000 | Kim et al. . |
| 6,052,238 | 4/2000 | Ebbesen et al. . |

FOREIGN PATENT DOCUMENTS 405240787A   9/1993   (JP) .

OTHER PUBLICATIONS

Botten, L.C. et al., "Inductive Grids in the Resonant Region: Theory and Experiment," *International Journal of Infrared and Millimeter Waves*, vol. 6, No. 7, pp. 511–575, (1985).

(List continued on next page.)

*Primary Examiner*—Stephone B. Allen
(74) *Attorney, Agent, or Firm*—Andrew G. Isztwan

(57) ABSTRACT

An apparatus for enhanced light transmission is provided. The apparatus comprises a metal film having a first surface and a second surface, at least one aperture provided in the metal film and extending from the first surface to the second surface, and a periodic surface topography provided on at least one of the first and second surface of the metal film. Light incident on one of the surfaces of the metal film interacts with a surface plasmon mode on at least one of the surfaces of the metal film thereby enhancing transmission of light through the at least one aperture in the metal film. The apparatus may have a single aperture or a plurality of periodically arranged apertures. Wavelength-selective optical filters, spatial optical filters, light collectors, near-field scanning optical microscope probes and photolithographic masks are also provided.

58 Claims, 18 Drawing Sheets

OTHER PUBLICATIONS

Ulrich, R., "Far–Infrared Properties of Metallic Mesh and Its Complementary Structure," *Infrared Physics*, vol. 7, pp. 37–55 (1967).

John, S., "Localization of Light", *Physics Today*, p. 32 (May 1991).

Yablonovitch, E. et al., "Hope for Photonic Bandgaps," *Nature*, vol. 351, p. 278 (1991).

Dalichaouch, R. et al., "Microwave Localization by Two–Dimensional Random Scattering," *Nature*, vol. 354, pp. 53–55 (1991).

Joannopoulus, J.D. et al., *Photonic Crystals*, Princeton University Press, pp. 4–7 (1995).

Haroche, S. et al., "Cavity Quantum Electrodynamics," *Physics Today*, pp. 24–30 (Jan. 1989).

Betzig, E. et al., "Near–Field Optics: Microscopy, Spectroscopy and Surface Modification Beyond the Diffraction Limit," *Science*, vol. 189, pp. 189–194 (1992).

Born, M. et al., *Principles of Optics*, Pergamon Press, pp. 401–409 (1980).

Ritchie, R.H. et al., "Surface–Plasmon Resonance Effect in Grating Diffraction," *Physical Review Letters*, vol. 21, No. 22, pp. 1530–1553 (1968).

Chen, Y.J. et al., "Surface Plasmons on Gratings: Coupling in the Minigap Regions," *Solid State Communications*, vol. 46, No. 2, pp. 95–99 (1983).

Kitson, S.C. et al., "Full Photonic Band Gap for Surface Modes in the Visible," *Physical Review Letters*, vol. 77, No. 13, pp. 2670–2673 (1996).

Lochbihler, H. et al., "Surface Polaritons on Gold–Wire Gratings," *Physical Review B*, vol. 50, No. 7, pp. 4795–4801 (1994).

Drexehage, K.H., "Interaction of Light with Monomolecular Dye Layers," *Progress in Optics*, vol. 12, pp. 165–232 (1974).

Roberts, A., "Near–zone fields behing circular apertures in thick, perfectly conducting screens," *Journal of Applied Physics*, vol. 65, No. 8, pp. 2896–2899 (1989).

Roberts, A., "Small–hole coupling of radiation into a near–field probe," *Journal of Applied Physics*, vol. 70, No. 8, pp. 4045–4049 (1991).

Wessel, J., "Surface–enhanced optical microscopy", *Journal of Optical Society of America B*, vol. 2, No. 9, pp. 1538–1541 (1985).

Fischer, U., "Submicrometer aperture in a thin metal film as a probe of its microenvironment through enhanced light scattering and fluorescence", *Journal of the Optical Society of America B*, vol. 3, No. 10, pp. 1239–1244, (1986).

Specht, M. et al., "Scanning plasmon near–field microscope," *Physical Review Letters*, vol. 68, No. 4, pp. 476–497 (1992).

Ulrich, R., "Interference Filters for the Far Infrared," *Applied Optics*, vol. 7, No. 10, pp. 1987–1996 (1968).

Sakai, K. et al., "Metallic Mesh Bandpass Filters and Fabry–Perot Interferometer for the Far Infrared," *Japanese Journal of Applied Physics*, vol. 8, No. 8, pp. 1046–1055 (1969).

Renk, K.F. et al., "Interference Filters and Fabry–Perot Interferometers for the Far Infrared", *Applied Optics*, vol. 1, No. 5, pp. 643–648 (1962).

Garg, R.K. et al, "Far–infrared characteristics of multi–element interference filters using different grids," *Infrared Physics*, vol. 18, pp.292–298 (1978).

Chase, S.T. et al., "Resonant array bandpass filters for the far infrared," *Applied Optics*, vol. 22, No. 1, pp. 1775–1779 (1983).

Larsen, T., "Survey of the Theory of Wire Grids," *IRE Transactions on Microwave Theory & Techniques*, pp. 191–201 (1962).

European Search Report. Application No. EP 99 116 396, dated Mar. 28, 2000.

Bethe, H. A., "Theory of Diffraction by Small Holes," *The Physical Review*, vol. 66, Nos. 7 and 8, pp. 163–182 (Oct. 1944).

Caldwell, M. E. et al., "Surface–plasmon spatial light modulators based on liquid crystal," *Applied Optics*, vol. 31, No. 20, pp. 3880–3891 (Jul. 1992).

Chown, M., "Tight fit," *New Scientist*, No. 2121 (Feb. 1998).

Cowan, J. J., "Aztec surface–relief volume diffractive structure," *Journal of the Optical Society of America*, vol. 7, No. 8, pp. 1529–1544 (Aug. 1990).

Ebbesen, T.W. et al., "Extraordinary optical transmission through sub–wavelength hole arrays," *Nature*, vol. 391, pp. 667–669 (Feb. 1998).

Evans, A. F. et al., "Measurement of the electrically induced refractive index change in silicon for wavelength $\lambda=1.3\mu m$ using a Schottky diode," *Applied Physics Letters*, vol. 56, No. 3, pp. 212–214 (Jan. 1990).

Haginoya, C. et al., "Nanostructure array fabrication with a size–controllable natural lithography," *Applied Physics Letters*, vol. 71, No, 20, pp. 2934–2936 (Nov. 1997).

Lezec, H., "Light Squeeze," *Science NOW* (Feb. 11, 1998).

Ghaemi, H.F. et al., "Surface plasmons enhance optical transmission through subwavelength holes," *Physical Review B*, vol. 58, No. 11, pp. 6779–6782 (Sep. 1998).

Raether, H., *Surface Plasmons on Smooth and Rough Surfaces and on Gratings*, Springer–Verlag, pp. 1–136 (1998).

Sambles, R., "More than transparent", *Nature*, vol. 391, pp. 641–642 (Feb. 1998).

Ordal, M. A. et al., "Optical properties of the metals, Al, Co, Cu, Au, Fe, Pb, Ni, Pd, Pt, Ag, Ti and W in the infrared and far infrared," *Applied Optics*, vol. 22, No. 7, pp. 1099–1119 (Apr. 1983).

Solgaard, O. et al., "High frequency attenuated total internal reflection light modulator," *Applied Physics Letters*, vol. 61, No. 21, pp. 2500–2502 (Nov. 1992).

Van Belle, M., "Photons Squeeze Through Tiny Holes," *Photonics Spectra*, pp. 36–37 (May 1998).

Villeneuve, P.R., "Light beats the diffraction limit," *Physics World*, pp. 28–29 (Apr. 1998).

Wang, Y., "Voltage–induced color–selective absorption with surface plasmons," *Applied Physics Letters*, vol. 67, No. 19, pp. 2759–2761 (Nov. 1995).

Weber, W. H. et al., "Optical electric–field enhancement at a metal surface arising from surface–plasmon excitiation," *Optics Letters*, vol. 6, No. 3, pp. 122–124 (Mar. 1981).

Boardman, A.D. (ed.), *Electromagnetic Surface Modes*, Wiley–Interscience Publication, pp. 1–76, 661–724 (1982).

Wood, R.W., "Anomalous Diffraction Gratings," *Physical Review*, vol. 48, pp. 928–936 (Dec. 1935).

Wood, R. W., "On a Remarkable Case of Uneven Distribution of Light in a Diffraction Grating Spectrum," *Philosophical Magazine*, vol. 4, pp. 396–403 (Jun. 1902).

Yeatman, E.M. et al., "Spatial light modulation using surface plasmon resonance," *Applied Physics Letters* vol. 55, No. 7, pp. 613–615 (Aug. 1989).

"Flooding light through tiny holes," *Science News*, vol. 153, No. 9 (Feb. 1998).

"Startling Amount of Light Gets Through Tiny Holes," John Wiley & Sons (1998).

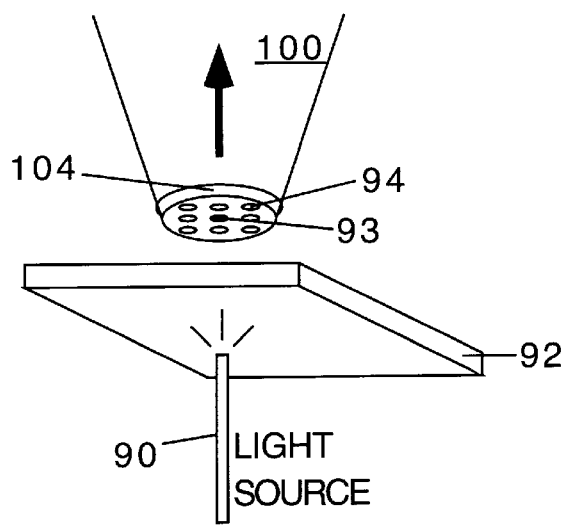
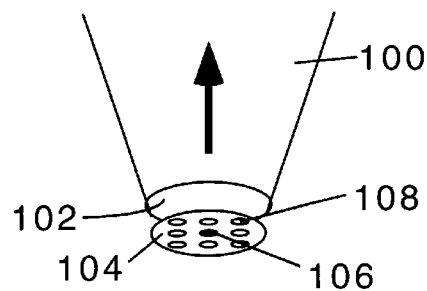
FIG. 16A
FIG. 16B
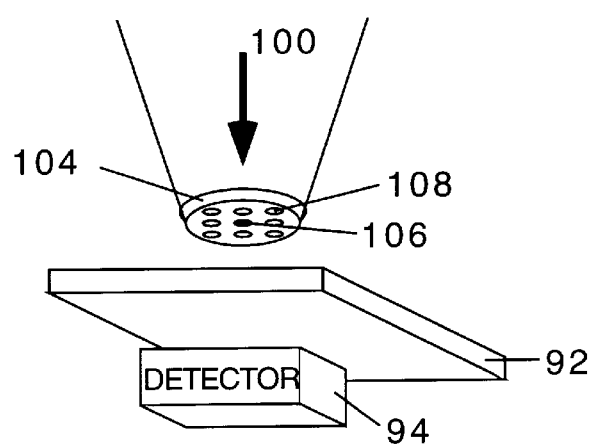
FIG. 16C

ENHANCED OPTICAL TRANSMISSION APPARATUS UTILIZING METAL FILMS HAVING APERTURES AND PERIODIC SURFACE TOPOGRAPHY

FIELD OF THE INVENTION

The present invention relates to the field of optics, and in particular to the enhanced transmission of light through a thin metal film having a periodic surface topography and perforated with one or more apertures.

BACKGROUND OF THE INVENTION

A smooth metal film having a thickness which is larger than its optical skin depth (the depth that the electromagnetic fields from incident light penetrate into the material where the electric field intensity drops to $1/e^2$, typically about 20 nm to 30 nm for a metal) is opaque to light at frequencies below the bulk plasma frequency $\omega_p$, which is given by $\omega_p^2 = (4\pi n e^2)/m^*$, where n is the electron density, e is the electron charge, and m is the effective mass. A single aperture in such a metal film transmits light with an efficiency which depends on the diameter of the aperture. If the aperture diameter is smaller than the wavelength of light passing through the aperture, the transmission is proportional to $(d/\lambda)^4$. See H. A. Bethe, "Theory of Diffraction by Small Holes", *Physical Review*, Second Series, Vol. 66, Nos. 7 and 8, pp. 163–182 (1944). For this reason, the optical throughput of near-field optical devices is extremely low.

Recently, a strong enhancement of optical transmission has been demonstrated using a metal film perforated with an array of subwavelength-diameter apertures. See T. W. Ebbesen et al., "Extraordinary optical transmission through subwavelength hole arrays," *Nature*, Vol. 391, pp. 667–669 (Feb. 12, 1998); see also U.S. patent application Ser. No. 08/979,432 now U.S. Pat. No. 5,973,316, to T. W. Ebbesen et al., filed Nov. 26, 1997, and U.S. Provisional Patent Application Ser. No. 60/051,904 to T. W. Ebbesen et al., filed Jul. 8, 1997, which are both incorporated herein by reference. This enhancement, which can be as large as a factor of 1,000, occurs when light incident on the metal film interacts resonantly with a surface plasmon mode. Surface plasmons (also referred to herein as simply "plasmons") are collective electronic excitations which exist at the interface of a metal with an adjacent dielectric medium. See H. Raether, *Surface Plasmons on Smooth and Rough Surfaces and on Gratings*, Vol. 111 of *Springer Tracts in Modern Physics* (Springer-Verlag, Berlin, 1988); A. D. Boardman (ed.), *Electromagnetic Surface Modes*, Chs. 1, 17, pp. 1–77, 661–725 (John Wiley & Sons, 1982). The periodic structure of the aperture arrays allows the surface plasmons to couple with the incident light.

On the other hand, the periodic array of apertures also has properties similar to those of a diffraction grating (see Ebbesen et al., supra), including the presence of Wood's anomaly (see R. W. Wood, "On a Remarkable Case of Uneven Distribution of Light in a Diffraction Grating Spectrum," *Philosophical Magazine*, Vol. 4, pp. 396–402 (1902), and R. W. Wood, "Anomalous Diffraction Gratings," *Physical Review*, Vol. 48, pp. 928–936 (1935)), which causes deep, sharp minima in the zero-order transmission when a higher-order diffracted beam becomes tangent to the metal film. The combination of these two effects (the surface plasmon coupling and Wood's anomaly) gives rise to well-defined maxima and minima in the zero-order transmission spectra. These maxima and minima exist at wavelengths which are determined by the geometry, both of the aperture array and that of the incident light, and the refractive index of the adjacent dielectric media. See Ebbesen et al., supra, and H. F. Ghaemi et al. "Surface plasmons enhance optical transmission through subwavelength holes", *Physical Review B*, Vol. 58, No. 11, pp. 6779–6782 (Sep. 15, 1998). Optical transmission control apparatus utilizing these properties have been developed. See U.S. patent application Ser. No. 09/168,265, now U.S. Pat. No. 6,040,936, to T. J. Kim et al., filed Oct. 8, 1998, which is incorporated herein by reference.

In previous aperture-array apparatus, every feature in the array is an aperture that transmits light. However, for some light transmission applications (such as near-field optical microscopy), it would instead be desirable to have the high transmission exhibited by the aperture arrays occur in a single aperture or a small set of apertures. It would also be desirable to further increase the transmission of an array of apertures. To date, such enhanced transmission has not been achieved.

The present invention overcomes this problem by providing enhanced light transmission apparatus wherein the metal film is provided with a periodic surface topography so as to allow strong coupling with the incident light. The metal film may be perforated with a relatively small array of apertures or even a single aperture depending on the application. In addition, the invention includes a novel near field scanning microscope, a novel mask technology for sub-wavelength photolithography, a wavelength-selective filter and a light collecting device utilizing the generalized enhanced light transmission apparatus.

SUMMARY OF THE INVENTION

Generally speaking, in accordance with the invention, an apparatus for enhanced light transmission is provided. The apparatus comprises a metal film having a first surface and a second surface, at least one aperture provided in the metal film and extending from the first surface to the second surface, and a periodic surface topography provided on at least one of the first and second surface of the metal film. Light incident on one of the surfaces of the metal film interacts with a surface plasmon mode on at least one of the surfaces of the metal film thereby enhancing transmission of light through the at least one aperture in the metal film. The apparatus may have a single aperture or a plurality of apertures arranged on a periodic lattice.

As noted above, the enhanced light transmission apparatus of the present invention includes a metal film with at least one surface having a periodic surface topography. The periodic surface topography includes surface features, such as periodically arranged protrusions or depressions in the metal film surface. The periodic surface topography allows strong coupling of the metal surface plasmons with incident light. The aperture(s) in the metal film thereby provide enhanced transmission for wavelengths in relation to the period and lattice symmetry of the periodic surface topography. The enhanced transmission is much greater than the transmission through apertures of the same size and number in the absence of the periodic surface topography, and this is due to the active participation of the surface plasmons of the metal film.

If subwavelength-diameter apertures are viewed, as has previously been the case, as merely geometrical openings, then the transmission efficiency (defined as the transmitted intensity divided by the intensity of the light impinging on the aperture) can be very small (e.g. about $2 \times 10^{-3}$ when the ratio of the aperture diameter to the wavelength is about 0.1).

However, in the present invention, as will be described below, the transmission efficiency is greatly increased and the resulting apparatus may be considered as a high efficiency subwavelength light source with the additional capability of tailoring the transmission properties of the light by adjusting the periodicity and the symmetry of the surface features comprising the periodic surface topography.

The practical effect of this result is that the general enhanced light transmission apparatus of the present invention may be applied as a wavelength-selective optical filter (particularly in the ultra-violet, visible and near-infrared wavelengths), a spatial optical filter, a light collector, a near field optical microscopy probe, and a photolithographic mask, all of which are set forth herein and are included in the invention.

Accordingly, an object of the invention is to provide an apparatus which provides enhanced light transmission through one or more apertures utilizing a periodic surface topography, such that the transmission is enhanced in comparison to the transmission through the apertures alone.

Another object of the invention is to provide an apparatus which provides enhanced light transmission through a single aperture.

A further object of the invention is to provide an apparatus which provides enhanced light transmission at selected wavelengths through one or more apertures.

A still further object of the present invention is to provide a wavelength-selective optical filter with one or more apertures which provides enhanced light transmission.

A still further object of the present invention is to provide a spatial optical filter which provides enhanced light transmission.

A still further object of the present invention is to provide a light collector with one or more apertures which provides enhanced light transmission.

A still further object of the present invention is to provide a near field scanning optical microscope probe with one or more apertures which provides enhanced light transmission.

A still further object of the present invention is to provide a photolithographic mask with one or more apertures which provides enhanced light transmission.

Other objects of the present invention will become more readily apparent in light of the following description in conjunction with the accompanying drawings.

BRIEF DESCRIPTION OF THE DRAWINGS

FIG. 16A is a perspective, schematic diagram of a near-field scanning optical microscope probe of the present invention, the probe being operated in a collection mode;

FIG. 16B is an exploded schematic diagram of a near-field scanning optical microscope probe of the present invention;

FIG. 16C is a perspective, schematic diagram of a near-field scanning optical microscope probe of the present invention, the probe being operated in an emission mode;

DETAILED DESCRIPTION OF THE PREFERRED EMBODIMENTS

Figure 1:
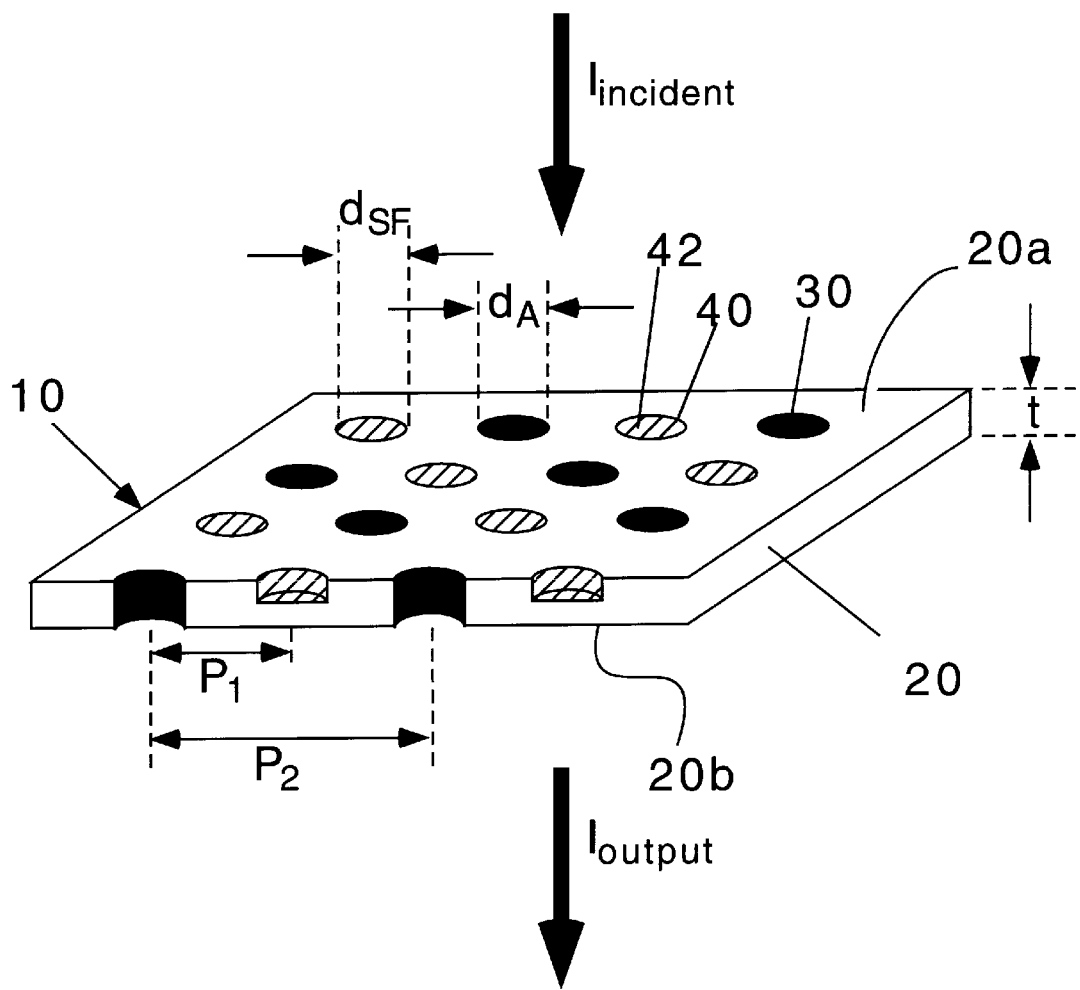
FIG. 1 is a perspective view of an exemplary embodiment of an enhanced light transmission apparatus of the present invention.

Referring now to the figures, FIGS. 1–5 illustrate (not necessarily to scale) several illustrative embodiments of an enhanced light transmission apparatus 10 of the present invention. Generally speaking, the enhanced light transmission apparatus 10 includes a thin metal plate or thin metal film 20 having a first surface 20a and a second surface 20b. The metal film 20 has at least one aperture or hole 30 provided therein, and at least one of the surfaces 20a, 20b of the metal film 20 includes a periodic surface topography as will be described below. Prior to describing particular embodiments of the invention, it will be useful to elaborate upon several terms which are important to understanding the invention.

Metal film 20 may comprise a metal film or a metal plate. The material comprising metal film 20 may be any conductive material, such as any metal or a doped semiconductor, and is preferably aluminum, silver, gold or chromium.

A surface which includes a periodic surface topography is any surface which exhibits raised and/or depressed regions (as opposed to a substantially smooth surface), wherein such regions are arranged with a periodicity or in a regularly repeated pattern (e.g. a regular, two-dimensional lattice). For example, surfaces which exhibit a periodic surface topography may include (but are not in any way limited to) the following: (1) a surface in which a plurality of cylindrical or semi-spherical concave depressions ("dimples") are provided, the dimples being arranged in a periodic pattern on the surface; (2) a surface in which a plurality of cylindrical or semi-spherical protrusions are provided, the semi-spherical protrusions being arranged in a periodic pattern on the surface; (3) a surface in which a plurality of curved or linear depressed grooves are provided, the grooves being arranged in a periodic pattern on the surface; (4) a surface in which a plurality of curved or linear raised ribs are provided, the ribs being arranged in a periodic pattern on the surface; (5) a surface in which a plurality of depressed or raised rings are provided, the rings being arranged in a periodic pattern (e.g. concentrically) on the surface; and (6) any combination of the above. In general, the periodic surface topography does not include the apertures 30 provided in the metal film 20, although a plurality of such apertures could be provided in a periodic pattern if desired.

To distinguish between apertures 30 (which pass through the entire thickness of the metal film) and protrusions/depressions in a metal film surface, which metal film is otherwise nominally smooth (aside from the apertures), the term "surface feature" will be used to refer to protrusions on the surface and depressions in the surface which do not pass through the entire thickness of the metal film and therefore are not apertures. For example, dimples, semi-spherical protrusions, grooves, rings and ribs are surface features. Surface features may be fabricated with any desired shape. In addition, the invention is not intended to be limited by any particular dimensions of the surface features. Nevertheless, it is preferable that the width or diameter $d_{SF}$ of a surface feature (that is, the dimension of a surface feature in the direction of periodicity) should be made less than the period P of the surface features. In addition, it is also preferable that the period P of the surface features multiplied by the refractive index $n_d$ of the medium adjacent the metal film should be made less than (and most preferably only slightly less than) the maximum wavelength $\lambda$ of light which is desired to be transmitted through the metal film. That is, the preferable relationships (which is not intended to limit the invention) between $d_{SF}$, P, $n_d\lambda$ are: $d_{SF}<P$ and $n_dP<\lambda$. (Note that if two different media are adjacent the two surfaces of the metal film, $n_d$ preferably corresponds to the smaller of the indices of refraction for the two media.) It should also be noted that the invention is effective so long as a plurality of periodic surface features (i.e. at least two) are present. Indeed, the invention is effective with as few as two periodic surface features.

Figure 2A:
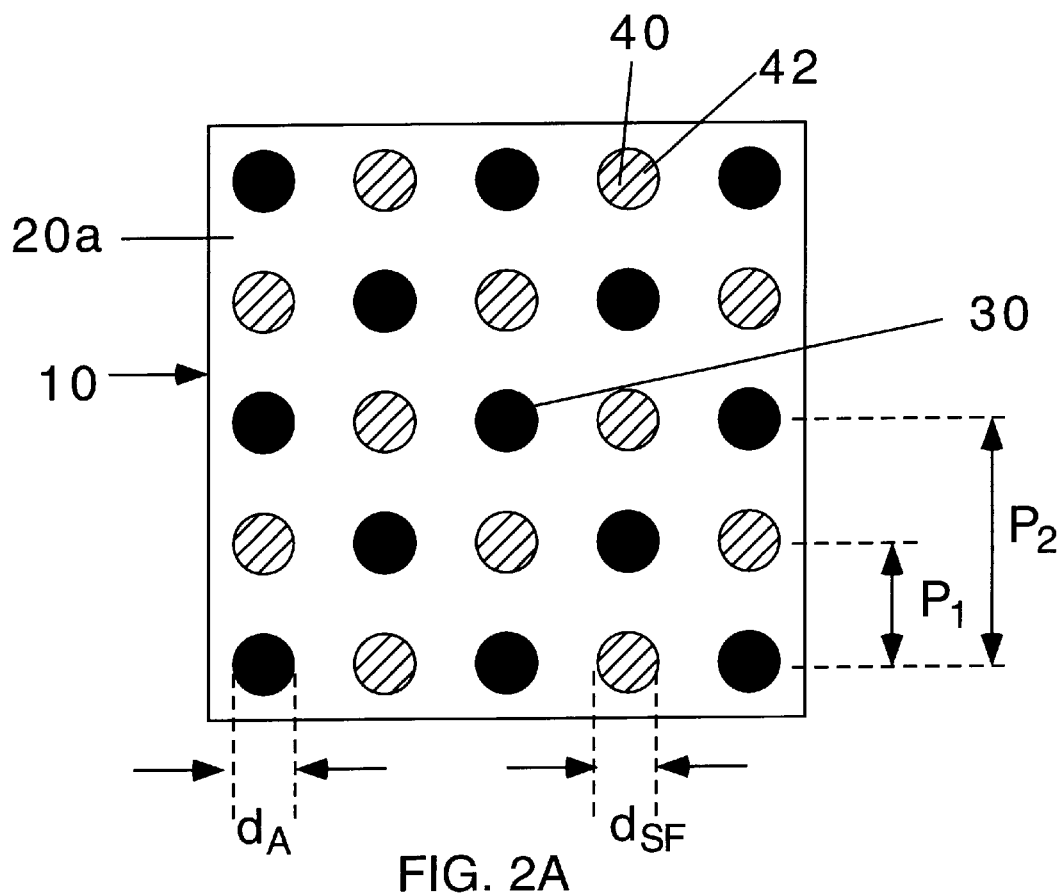
FIGS. 2A and 2B are plan views of first and second metal film surfaces, respectively, of the enhanced light transmission apparatus shown in FIG. 1.
Figure 2B:
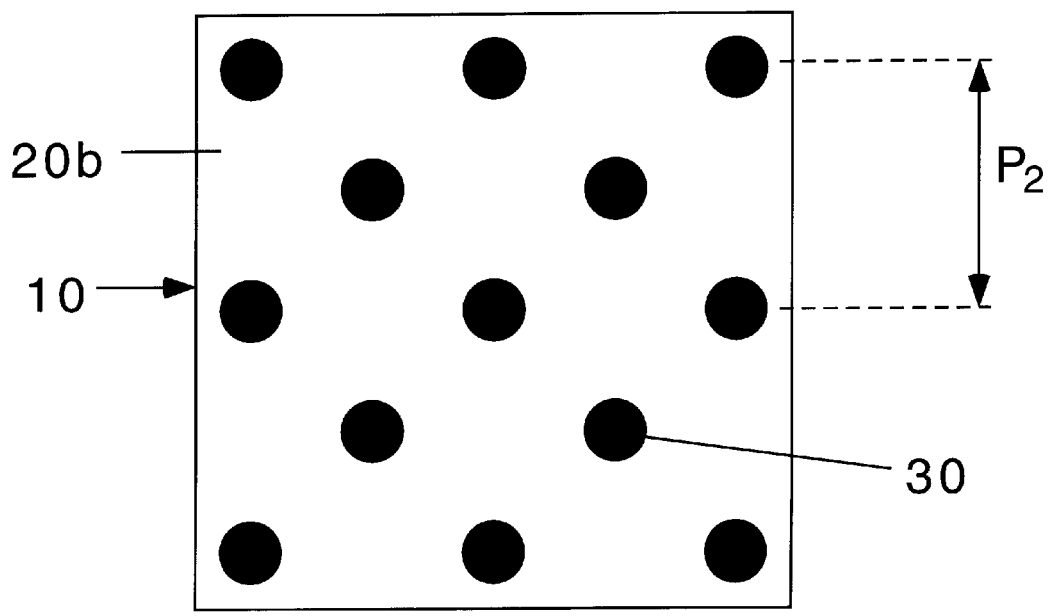

FIG. 1 is a perspective view of one exemplary embodiment of the enhanced light transmission apparatus of the present invention. The enhanced light transmission apparatus 10 shown in FIG. 1 includes a metal film 20 having a first surface 20a and a second surface 20b, each of which includes a periodic surface topography. Plan views of the first surface 20a and second surface 20b are shown in FIGS. 2A and 2B, respectively. As shown in FIG. 2A, first surface 20a includes a square array of apertures 30 and surface features 40 comprising dimples 42, wherein the array of dimples 42 have a period of $P_1$. The dimples have a diameter of $d_{SF}$ as shown. As shown in FIG. 2B, second surface 20b includes an array of apertures 30 only which project through the entire thickness of the metal film 20, the aperture array having a period of $P_2$. As will be noted from a comparison of FIGS. 2A and 2B, the periodic surface topography of first surface 20a has a period $P_1$ which is half the period $P_2$ of the periodically arranged array of apertures on both surfaces 20a and 20b. The particular 2:1 ratio of periods $P_2:P_1$ shown in FIGS. 2A and 2B is merely illustrative and is not a value necessary for the invention.

Incident light, having an intensity of $I_{incident}$ and symbolically depicted by the arrow at the top of FIG. 1, is directed at the first surface 20a of metal film 20 and is transmitted from the aperture 30 at second surface 20b of metal film 20 as output light having an enhanced intensity of $I_{output}$ and symbolically depicted by the arrow at the bottom of FIG. 1. It should be noted that enhanced transmission intensity also occurs if the light travels in the opposite direction through the structure (that is, if the light is incident on the second surface 20b and is transmitted as output light from first surface 20a having the periodic surface topography), but the enhancement in transmission intensity appears not to be as great in such a configuration. Accordingly, for maximum transmission enhancement, it is preferred that the light is incident on the surface having the periodic surface topography.

As shown in FIG. 1, the diameter of an aperture 30 is denoted as $d_A$. For maximum transmission enhancement and maximum resolution, the diameter of the aperture(s) is preferably less than the wavelength of light incident on the aperture(s) (that is, the aperture(s) preferably have subwavelength diameter). The thickness of the metal film 20 is denoted as t, and must be greater than the optical skin depth of the metal film (that is, the metal film should be sufficiently thick so as to be optically opaque), and is preferably in the range of approximately 0.05 to 10 times the aperture diameter $d_A$.

In the embodiment of FIGS. 1–2, an unsupported thin metal plate 20 is shown (that is, the metal plate 20 is not adjacent to or adhered to a supporting structure). However, a thin metal film 20 fixed to a substrate, such as by depositing the metal film on a glass or quartz, is also contemplated by the present invention. For example, a silver film of thickness t=0.2 µm may be deposited by evaporation on a fused quartz or glass substrate. When a substrate is used, the periodic surface may be provided on either the exposed (air) surface or on the surface at the metal film-substrate interface. If the periodic surface topography is provided on the metal surface at the metal film-substrate interface, the surface features may be provided on the metal film by, for example, creating a "negative" of the pattern on the substrate surface and depositing the metal film onto the negatively patterned substrate surface.

Furthermore, while the apertures 30 and dimples 42 in the embodiment of FIGS. 1–2 are shown as round or cylindrical, these features may have other shapes, such as oval, rectangular or slit-shaped, without departing from the scope of the invention. Indeed, surface features 40 may include protrusions and/or depressions in the corresponding surface of any size (so long as the width or diameter $d_{SF}$ of the surface feature is less than the period of the surface features) or shape as discussed above. Additionally, while the periodic arrays shown in the embodiment of FIGS. 1–2 are square arrays, other two-dimensional periodic array configurations of apertures and surface features are also possible, such as triangular, without deviating from the teaching of the invention.

Figure 3A:
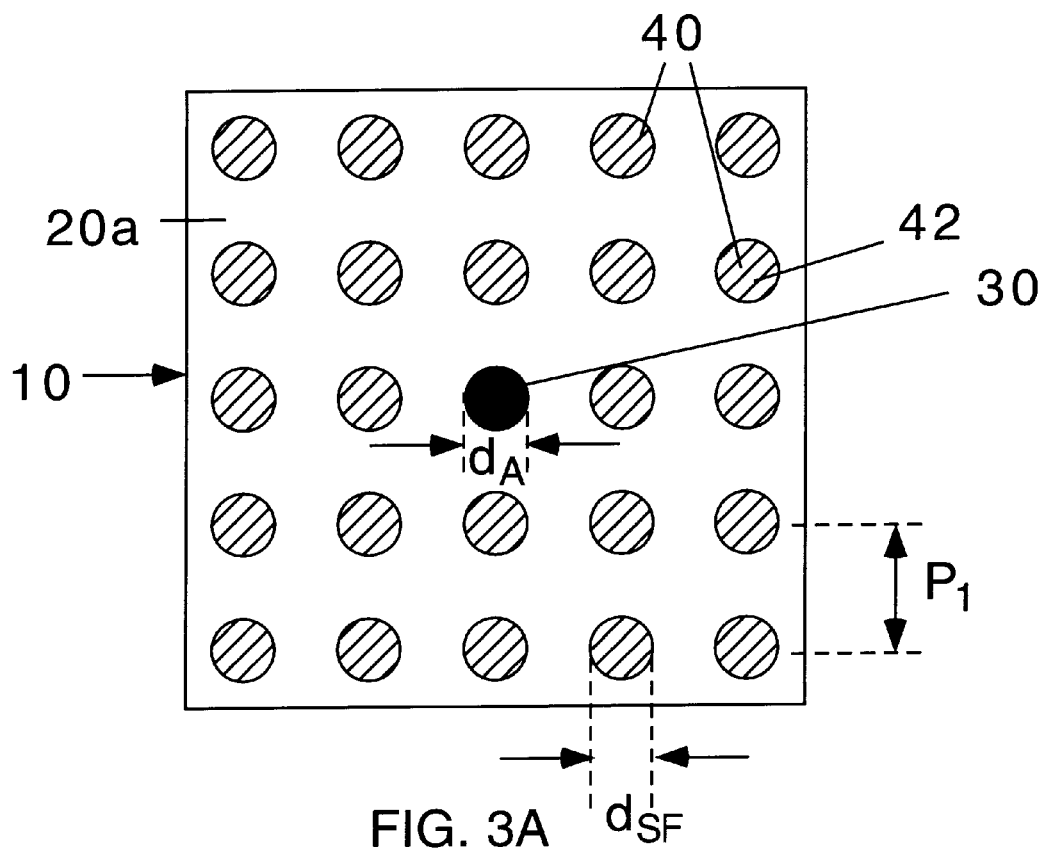
FIGS. 3A and 3B are plan views of first and second metal film surfaces, respectively, of another exemplary embodiment of an enhanced light transmission apparatus of the present invention.
Figure 3B:
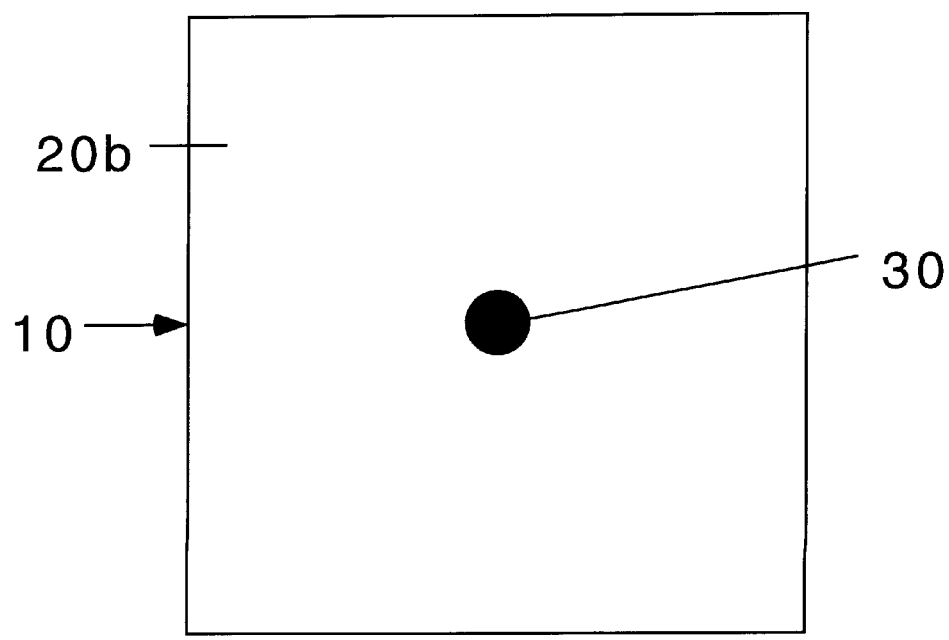

FIGS. 3A and 3B are plan views of first and second surfaces 20a and 20b, respectively, of another exemplary embodiment of the enhanced light transmission apparatus of the present invention. In this embodiment, the metal film 20 has a single aperture 30 provided therein. First surface 20a is provided with the single aperture 30 and surface features 40 comprising a plurality of dimples 42 similar to those shown in the embodiment of FIGS. 1–2, the dimples 42 having a diameter $d_{SF}$ as shown and being arranged in a periodic pattern with a period $P_1$. Second surface 20b is provided only with the single aperture 30. When light is directed incident on first surface 20a, output light having an enhanced intensity is transmitted from the aperture 30 at second surface 20b.

Figure 4A:
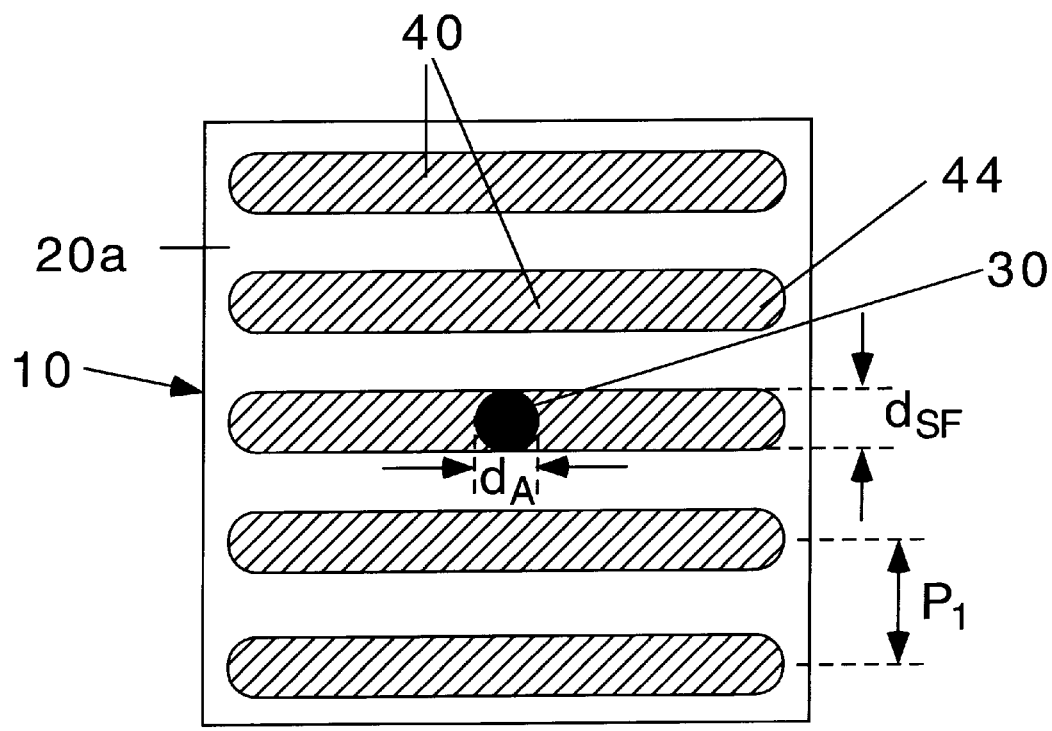
FIGS. 4A and 4B are plan views of first and second metal film surfaces, respectively, of yet another exemplary embodiment of an enhanced light transmission apparatus of the present invention.
Figure 4B:
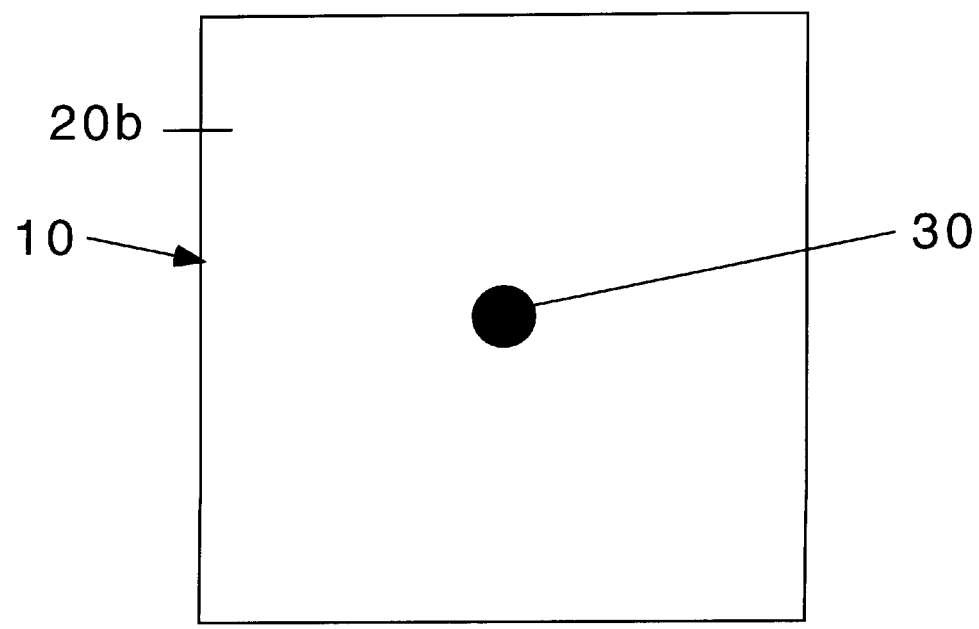

FIGS. 4A and 4B are plan views of first and second surfaces 20a and 20b, respectively, of yet another exemplary embodiment of the enhanced light transmission apparatus of the present invention. Again in this embodiment, the metal film 20 has a single aperture 30 provided therein. First surface 20a is provided with the single aperture 30 and surface features 40 comprising depressed grooves 44, the grooves 44 having a width in the direction of periodicity of $d^{SF}$ as shown and being arranged in a periodic pattern (coextensive and parallel to one another) with a period $P_1$. Second surface 20b is provided only with the single aperture 30. When light is directed incident on first surface 20a, output light having an enhanced intensity is transmitted from the aperture 30 at second surface 20b.

Figure 5A:
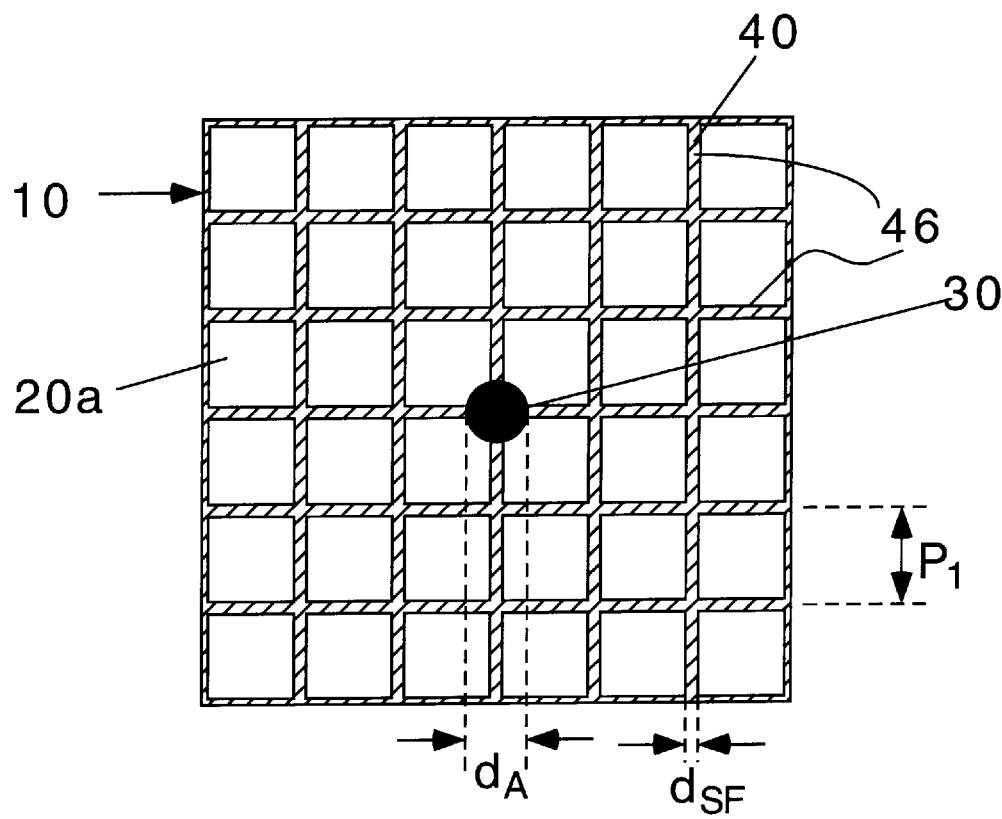
FIGS. 5A and 5B are plan views of first and second metal film surfaces, respectively, of still another exemplary embodiment of an enhanced light transmission apparatus of the present invention.
Figure 5B:
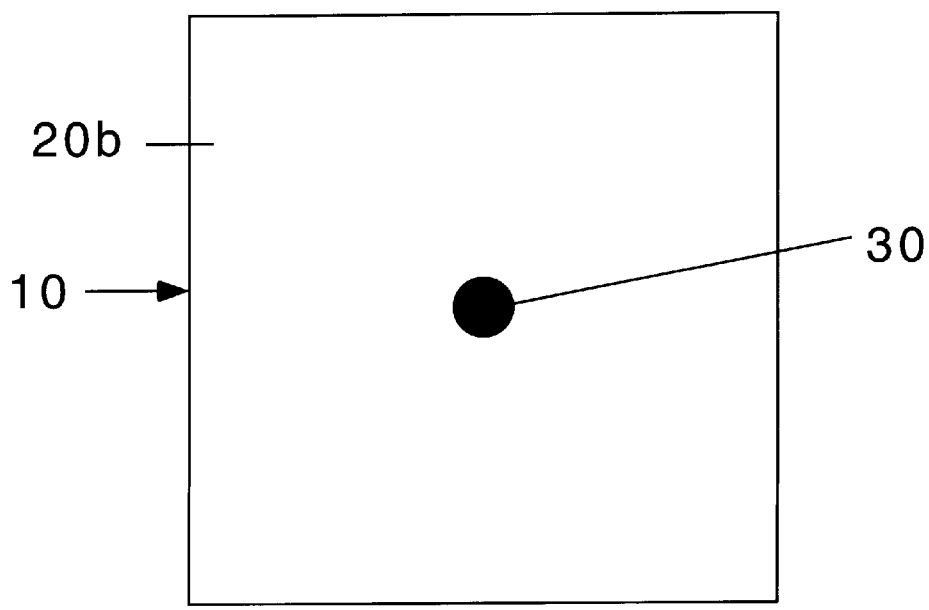

FIGS. 5A and 5B are plan views of first and second surfaces 20a and 20b, respectively, of yet another exemplary embodiment of the enhanced light transmission apparatus of the present invention. Once again in this embodiment, the metal film 20 has a single aperture 30 provided therein. First surface 20a is provided with the single aperture 30 and surface features 40 comprising depressed grooves 46, the grooves 46 having a width in the direction of periodicity of $d_{SF}$ as shown and being arranged in a periodic pattern (two sets of parallel grooves intersecting with each other at right angles) with a period $P_1$. The grooves 46 in the illustrated embodiment are shown as being relatively narrower in width than the grooves 44 in the embodiment of FIG. 4, but this need not be the case. The horizontal grooves 46 are also shown as having the same width as the vertical grooves 46 in the figure, but this also does not need to be the case. The two sets of parallel grooves also need not intersect at right angles, but may instead intersect at other angles. Additionally, the spacing between grooves need not be the same in the two sets of parallel grooves. Furthermore, more than two intersecting sets of grooves may be provided. Second surface 20b is provided only with the single aperture 30. When light is directed incident on first surface 20a, output light having an enhanced intensity is transmitted from the aperture 30 at second surface 20b.

Figure 6A:
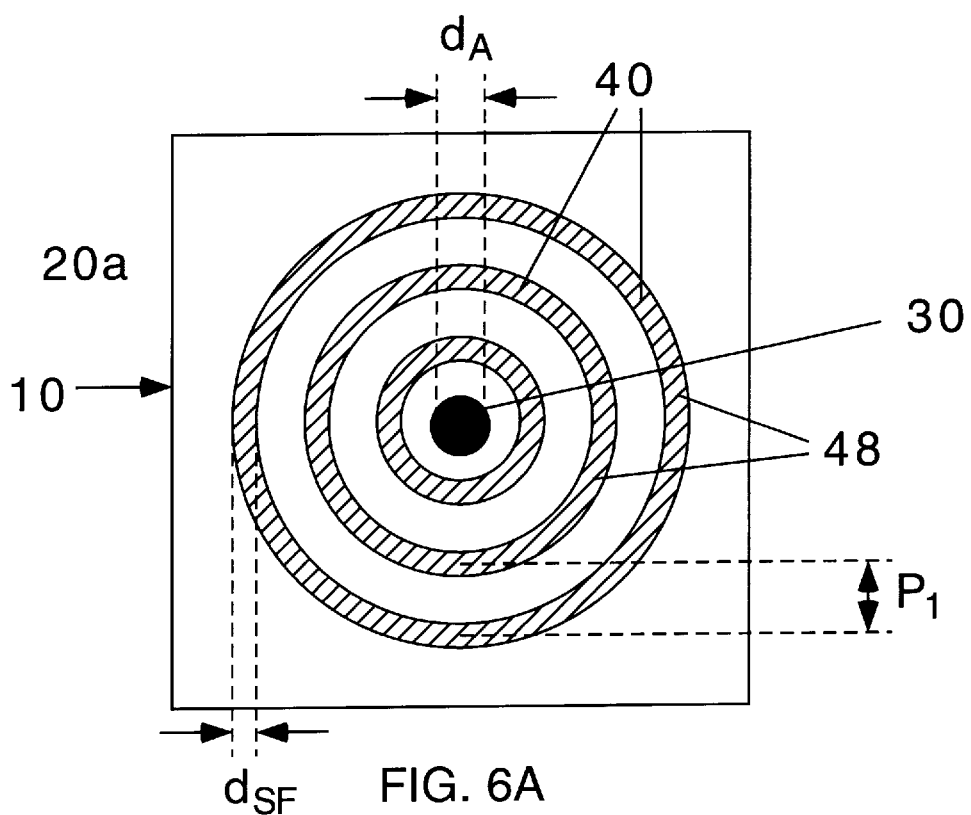
FIGS. 6A and 6B are plan views of first and second metal film surfaces, respectively, of still another exemplary embodiment of an enhanced light transmission apparatus of the present invention.
Figure 6B:
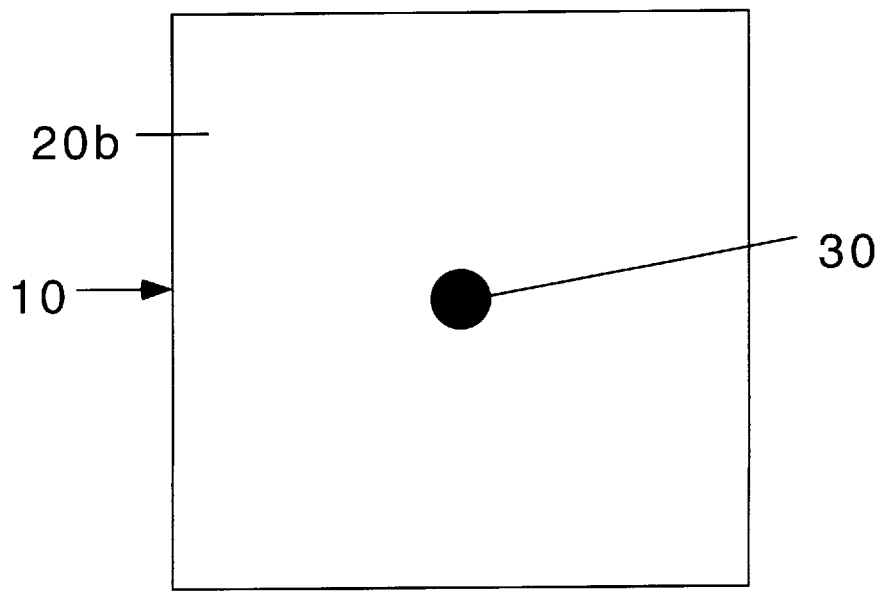

FIGS. 6A and 6B are plan views of first and second surfaces 20a and 20b, respectively, of yet another exemplary embodiment of the enhanced light transmission apparatus of the present invention. Once again in this embodiment, the metal film 20 has a single aperture 30 provided therein. First surface 20a is provided with the single aperture 30 and surface features 40 comprising depressed concentric rings 48. The periodicity in this embodiment is in the radial direction as opposed to the (x, y) periodicity shown in FIGS. 1–5. The rings 48 have a width in the direction of periodicity of $d_{SF}$ as shown and are arranged in a periodic pattern (i.e. concentrically with periodically increasing radii) with a period P. Second surface 20b is provided only with the single aperture 30. When light is directed incident on first surface 20a, output light having an enhanced intensity is transmitted from the aperture 30 at second surface 20b.

In the embodiments of FIGS. 1–6, depressed surface features (e.g. dimples, grooves, and depressed rings) are shown. The invention also encompasses raised surface features as noted above, and raised surface features provided in the periodically arrangements shown in FIGS. 1–6 (e.g. raised protrusions, raised ribs, or raised rings) could alternatively be provided.

The structured surfaces depicted in FIGS. 1–3 and 5 have been experimentally fabricated as follows. A metal film comprised of silver, having a thickness of about 300 nm, was thermally evaporated onto a quartz substrate. The silver film was optically opaque. Apertures and surface features were then fabricated in the metal film using a Micrion 9500 Focused Ion Beam machine (50 keV Ga ions, 5 nm nominal spot diameter). The individual aperture diameter $d_A$, and the dimensions of surface features $d_{SF}$ (such as the diameter of the dimples or the width of the grooves), were varied between 100 nm and 600 nm among different individual samples. The periodicity of the surface topography, $P_1$, was also varied between 0.4 µm and 2.0 µm.

To analyze the operation of the apparatus, the zero-order transmission images and spectra were recorded as follows. Single images and spectra were obtained using a far-field transmission imaging microscope (Nikon TE2000). The image was focused onto the entrance slit of a spectrometer (ISA Triax 320) and detected with a liquid nitrogen-cooled charge coupled device (CCD, Princeton Instruments) camera. For imaging purposes, the diffraction grating was replaced with a mirror, and the image was projected onto the CCD. Spatial isolation of a single aperture or array along the horizontal axis was achieved using the entrance slit of the spectrometer.

The physical principles which give rise to enhanced light transmission through a metal film, provided with a periodic surface topography and perforated with one or more apertures, which yield the enhanced light transmission offered by the present invention, will now be discussed to enhance understanding of the operation of the invention.

As discussed above, a metal film perforated with an array of apertures and with nominally smooth surfaces (that is, without a surface with a periodic surface topography) exhibit distinct zero-order transmission spectra with well-defined peaks and strongly enhanced transmission efficiencies. These maxima result from a resonant interaction of incident light with surface plasmons on both surfaces 20a and 20b of the metal film. See Ghaemi et al., supra.

Figure 7:
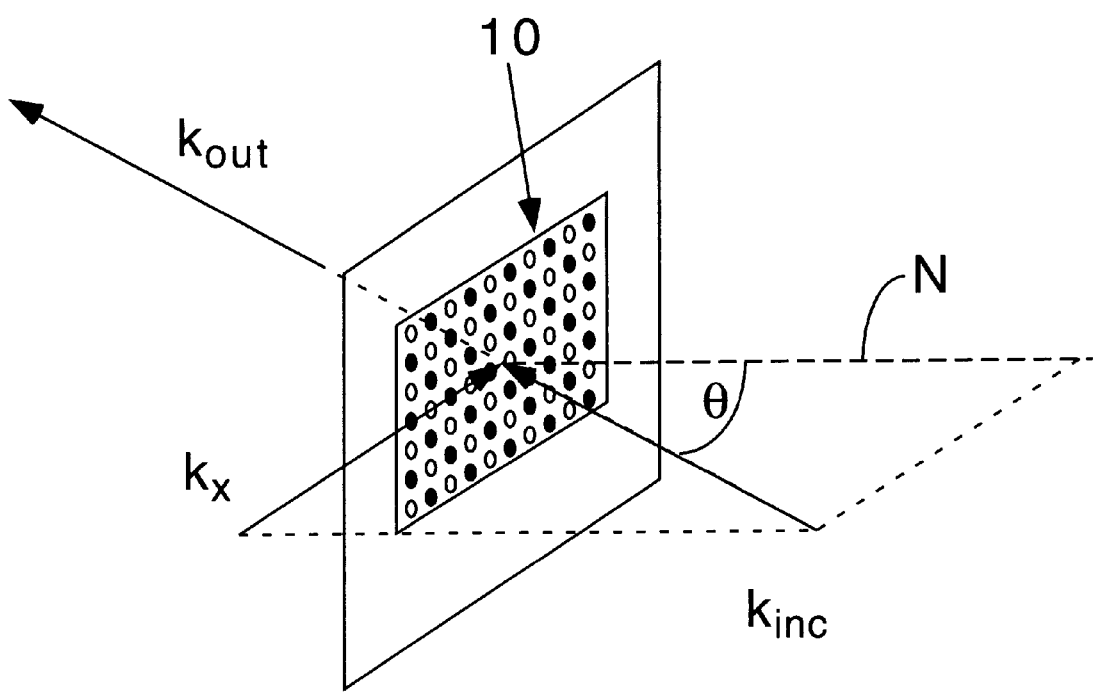
FIG. 7 is a perspective, schematic diagram illustrating the geometry of incident and output light with respect to the enhanced light transmission apparatus of the present invention.

FIG. 7 illustrates the relevant geometries of incident and output light and its coupling to surface plasmons in the metal film of the apparatus of the present invention. An enhanced light transmission apparatus 10, constructed according to the present invention, is shown with incident light wavevector $k_{inc}$ and output light wavevector $k_{out}$. Wavevector kin, is incident on enhanced light transmission apparatus 10 at an angle θ with respect to a normal N to the surface of enhanced light transmission apparatus 10. Wavevector $k_{out}$ is parallel to wavevector $k_{inc}$. Wavevector $k_x$ is that portion of $k_{inc}$ which lies in the plane of the surface of enhanced light transmission apparatus 10.

When the incident light is p-polarized (that is, the incident electric field is parallel to the x-axis while the perforated metal film unit is rotated about the y-axis through an angle θ), the coupling of light with surface plasmons on a metal surface with any periodic structure (such as a periodic surface topography or a periodic array of apertures, or a combination of both) follows momentum conservation (see H. Raether, supra):

$$\vec{k}_{sp} = \vec{k}_x + i\vec{G}_x + j\vec{G}_y \tag{1}$$

where $\vec{k}_{sp}$ is the surface plasmon wave vector; $\vec{k}_x = \hat{x}(2\pi/\lambda) \sin\theta$ is the component of the wavevector of the incident light $k_{inc}$ which lies in the plane of the metal film as shown in FIG. 7; $\vec{G}_x$ and $\vec{G}_y$ are the reciprocal lattice vectors corresponding to the periodic lattice of the surface structure, for example a square lattice with $\vec{G}_x = \vec{G}_y = (2\pi/P)$, where P is the period of the surface features; θ is the angle between the incident wavevector $k_{inc}$ and the surface normal N of the metal film as shown in FIG. 7; and i and j are integers. The magnitude of $\vec{k}_{sp}$ can be found from the dispersion relation (see H. Raether, supra):

$$|\vec{k}_{sp}| = \frac{\omega}{c}\sqrt{\frac{\varepsilon_m \varepsilon_d}{\varepsilon_m + \varepsilon_d}} \tag{2}$$

where ω is the angular frequency of the incident optical beam, and $\varepsilon_m$ and $\varepsilon_d$ are the dielectric constants of the metal and dielectric medium, respectively. Here, it is assumed that $\varepsilon_m < 0$ and $|\varepsilon_m| > \varepsilon_d$, which is the case for a metal below the bulk plasmon energy and also for a doped semiconductor. See H. Raether, supra; M. Ordal et al., "Optical Properties of the metals Al, Co, Cu, Au, Fe, Pb, Ni, Pd, Pt, Ag, Ti, and W in the infrared and far infrared," *Applied Optics*, Vol. 22, No. 7, pp. 1099–1119 (Apr. 1, 1983). When the transmitted intensity is plotted on a gray scale as a function of E and $k_x$, the resulting energy-momentum (E, $k_x$) diagram (also known as a "dispersion diagram") shows a set of bands of high transmission, which set of bands reproduces the surface plasmon dispersion given in Equation (2). The transmission spectra are independent of which side of the perforated metal film is illuminated, even if the media substantially adjacent to the metal film are significantly different.

Figure 8A:
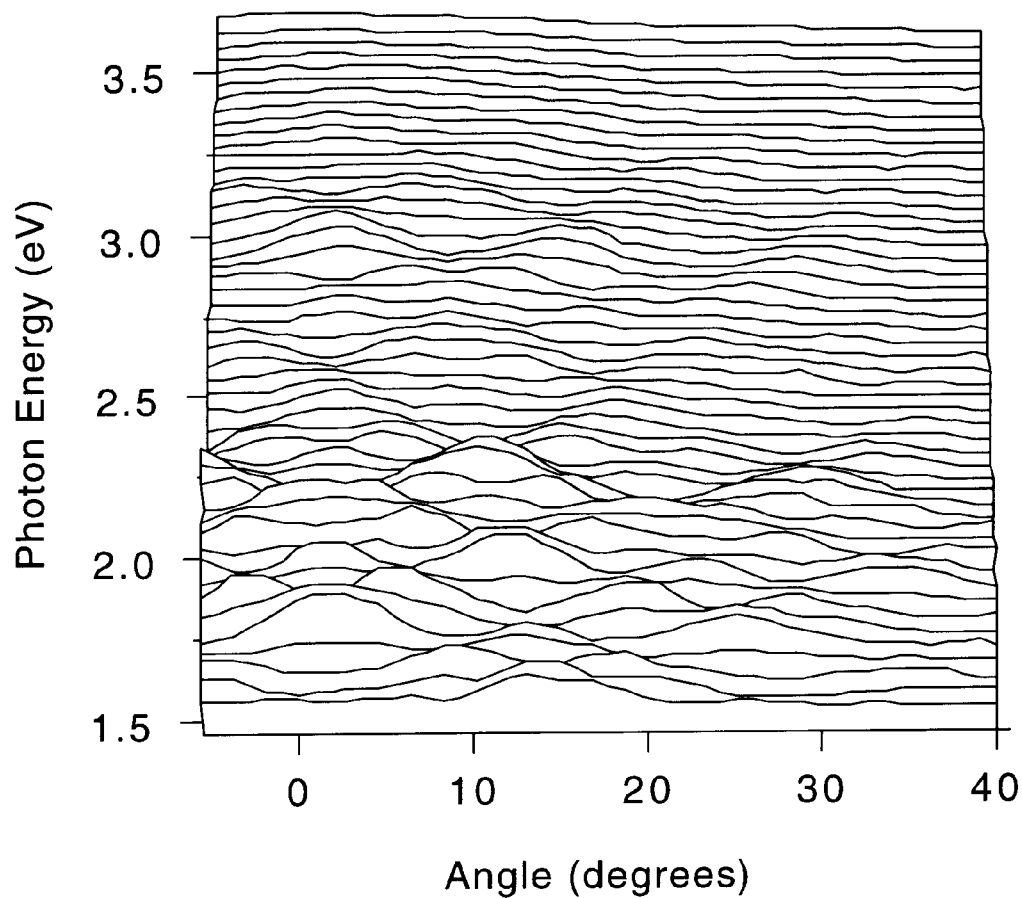
FIG. 8A is a graph showing the transmission of light, as a function of photon energy and the incident angle of input light, through a metal film perforated with an array of apertures, wherein neither of the two surfaces of the metal film includes a periodic surface topography.
Figure 8B:
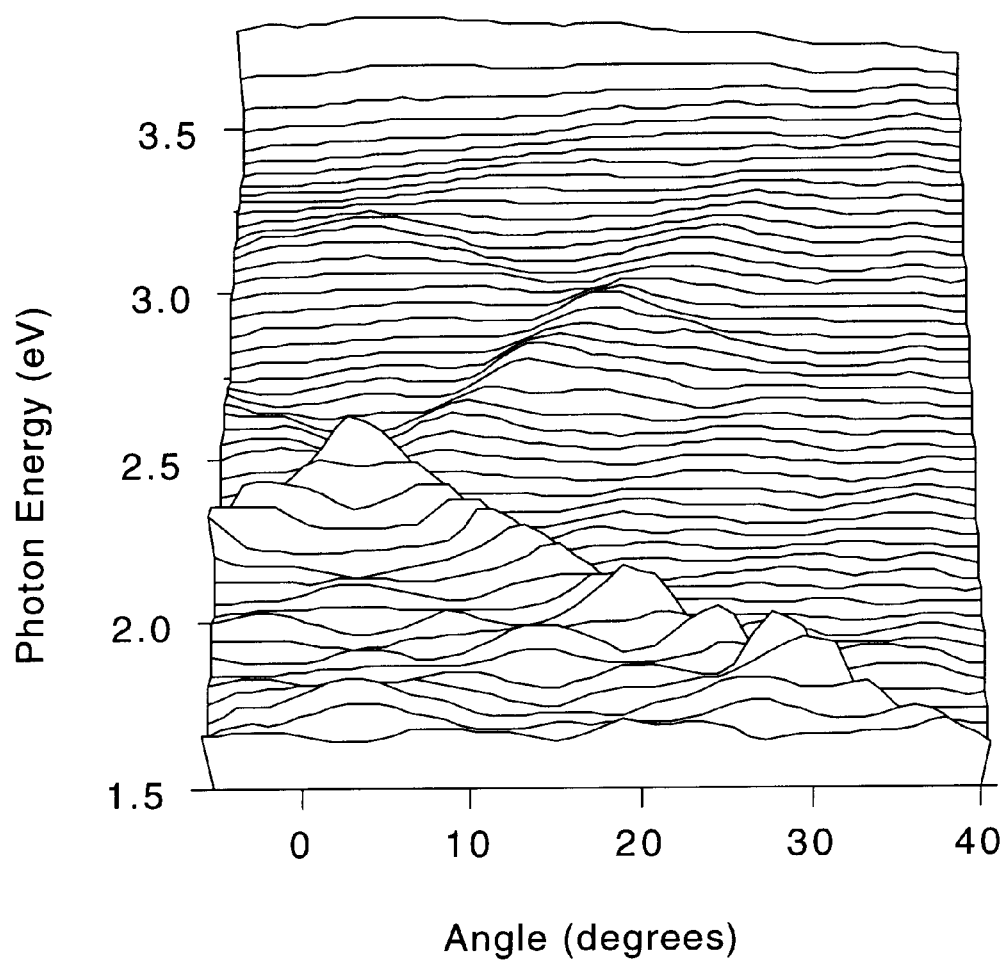
FIG. 8B is a graph showing the transmission of light, as a function of photon energy and the incident angle of input light, through a metal film perforated with an array of apertures, wherein one of the two surfaces includes a periodic surface topography similar to that shown in FIGS. 1 and 2.

These effects are illustrated in FIGS. 8A and 8B. FIGS. 8A and 8B are wire diagrams showing transmitted spectra as a function of incident light angle θ for a metal film with an array of apertures but without having a periodic surface topography (FIG. 8A), and for a metal film with an array of apertures and having a periodic surface topography (FIG. 8B). In particular, the structure used to generate the data shown in FIG. 8B includes a periodic array of dimples and is similar to the embodiment shown in FIGS. 1 and 2. In each case, the metal film is a silver film about 300 nm thick deposited on a quartz substrate, the diameter of the apertures is about 200 nm, and in the case of FIG. 8B, the diameter of the dimples is also about 200 nm. The period of the apertures alone is P=2.0 μm, while the period of dimples is P=0.5 μm.

The minima in the transmission spectrum were identified as the result of Wood's anomaly, which occurs in diffraction gratings when a diffracted beam emerges tangent to the grating. See H. F. Ghaemi et al., supra; R. W. Wood, supra. The conditions for the occurrence of Wood's anomaly are similar to Equations (1) and (2), except that $\vec{k}_{sp}$ is replaced by the wavevector of the grazing (tangent to the grating) light, which has a magnitude given by $k_{diff} = [(2\pi n_d)/\lambda]$, where $n_d = \sqrt{\varepsilon_d}$, the refractive index of the supporting layer. For highly ordered arrays, the widths of the Wood's anomaly minima can be very small, and in general have been found to be limited by the resolution of the spectrometer. Wood mentioned the fact that in high quality diffraction gratings, the two main sodium lines can be separated by this effect, corresponding to a wavelength resolution of 0.6 nm. The optical filter of the present invention (described below) utilizes this phenomenon by modulating the transmitted intensity with a high contrast ratio by varying the angle of incidence of light to the metal film θ over a very small amount, as will be discussed below.

The geometry dependence for the occurrence of Wood's anomaly gives a set of minima which closely follow the dispersion of the surface plasmon branches in the (E, $k_x$) diagram. Since the majority of dispersion curves traverses the (E, $k_x$) plane with finite slope, it follows that for a fixed photon energy E (or fixed wavelength), the transmitted intensity traverses maxima and minima as the angle of incidence θ is varied. Accordingly, either the wavelength or the amplitude of the transmitted light can be controlled by varying the angle of incidence θ.

Conversely, for fixed incident angle θ, the transmission exhibits minima and maxima as E (or λ) is varied. When light is incident normal to the metal film (i.e. θ=0), the wavelengths at which the maxima occur can be found by combining Equations (1) and (2), $$\lambda_{max} = \frac{P}{\sqrt{i^2 + j^2}}\sqrt{\frac{\varepsilon_m \varepsilon_d}{\varepsilon_m + \varepsilon_d}} \tag{3}$$

and similarly for the minima:

$$\lambda_{min} = \frac{P}{\sqrt{i^2 + j^2}}\sqrt{\varepsilon_d} \tag{4}$$

There will be one set of maxima and minima in the transmission spectrum for each surface of the array. If the medium in contact with the metal film on one side (surface) is air and the other is quartz, for example, then the maxima and minima in the transmission spectrum for each surface will be distinguishable from one another due to the refractive index difference between quartz and air. See Ebbesen et al., supra, and Ghaemi et al., supra.

The inventors have found that if the surface of the metal film is structured with periodic indentations or bumps (that is, if the surface is provided with a periodic surface topography), the metal film still has well-defined surface plasmon resonances even when provided with relatively fewer apertures than found in previous devices which have apertures only. This is graphically demonstrated in FIG. 9, which compares the typical zero-order transmission spectrum of two metal films, one of which is provided with apertures only and the other of which is provided with apertures as well as surface features on one surface in the configuration of FIGS. 2A and 2B. The metal films are silver films with a thickness of about 300 nm. In each metal film, one surface is adjacent to a quartz substrate and the other surface is exposed to air. In the first metal film (represented by a dashed line), a square array of apertures only is provided, the array having a period P of 1 $\mu$m on both the air- and quartz-side surfaces (P(air-side surface)=P(quartz-side surface)=1 $\mu$m). In the second film (represented by a solid line), a square array of apertures and indentations or dimples is provided on the air-side surface with a period P(air-side surface)=0.5 gm, and a corresponding square array of apertures only is provided on the quartz-side surface with a period of P(quartz-side surface)=1.0 $\mu$m. The aperture and dimple diameters are about 200 nm. The notation used to refer to the peaks in FIG. 9 uses (i, j) pairs as defined by Equations (3) and (4), followed by either the letter "A" referring to the air-side surface or the letter "G" referring to the quartz-side (glass) surface, followed by the period size in microns.

Figure 9:
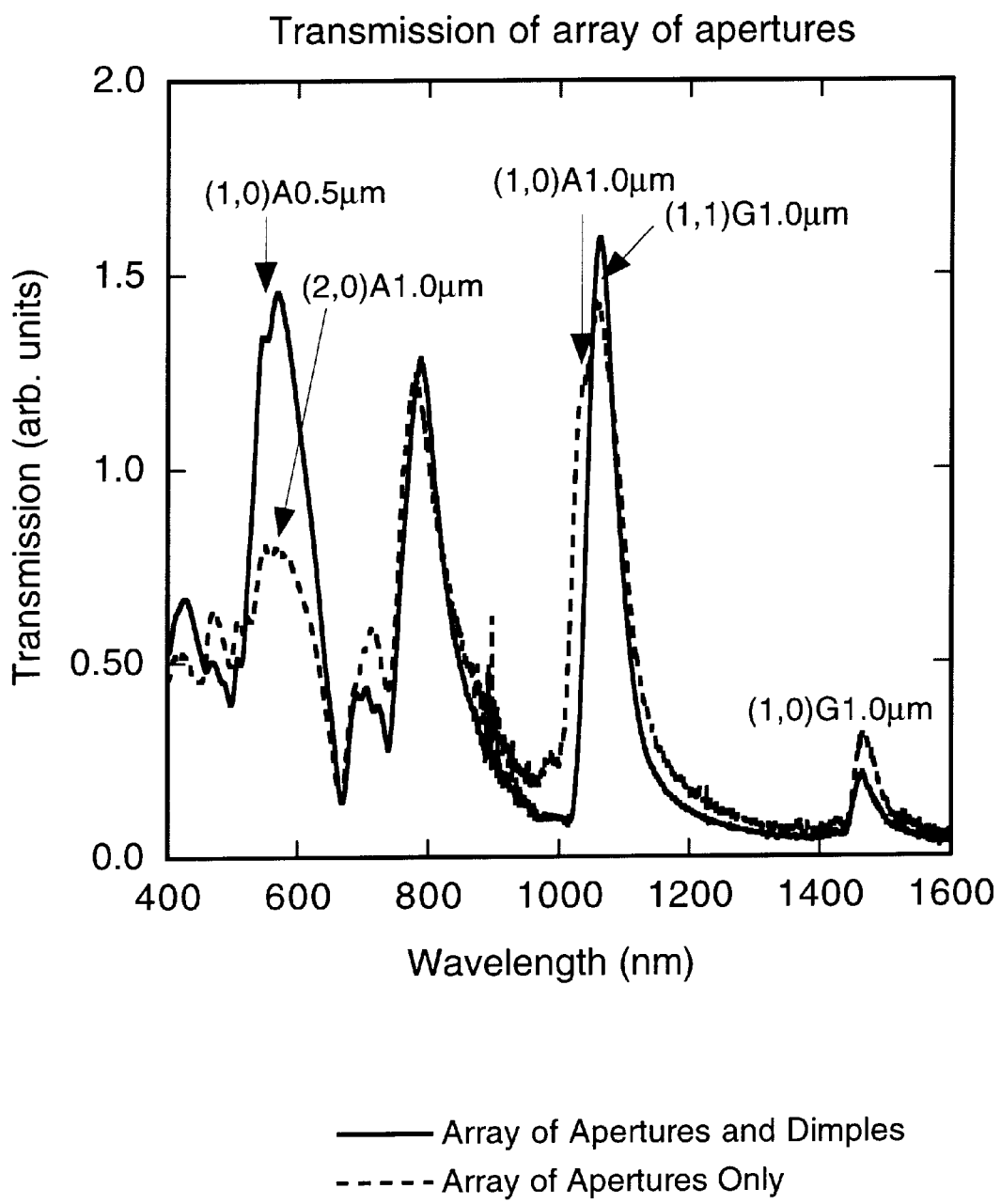
FIG. 9 is a graph showing the zero-order transmission of two metal films, one metal film being provided with a square array of round apertures with a period P=1 $\mu$m, and the other metal film being provided with an identical array of apertures with the same period P and also with a surface having a periodic surface topography which is positionally commensurate with the apertures and which has a period of P/2.
Figure 10A:
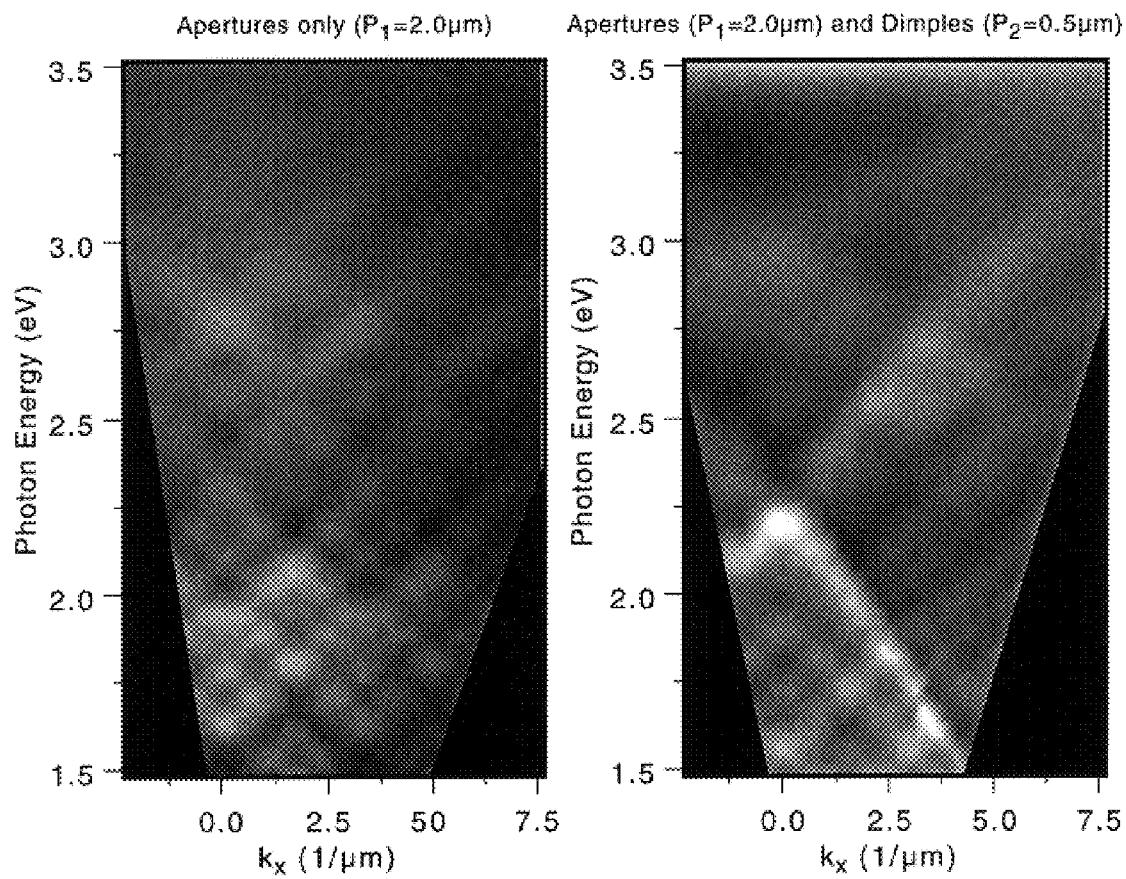
FIG. 10A is a graph showing the transmission of light, in gray scale, as a function of photon energy E=hc/$\lambda$, and $k_x=k_{inc} \sin \theta$, through a metal film perforated with an array of apertures, wherein neither of the two surfaces of the metal film includes a periodic surface topography.
Figure 10B:
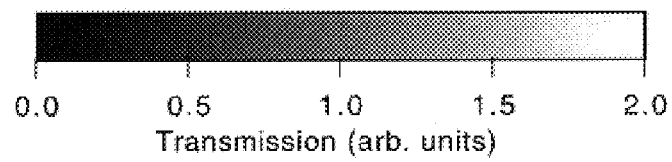
FIG. 10B is a graph showing the transmission of light, in gray scale, as a function of photon energy E=hc/$\lambda$, and $k_x=k_{inc} \sin \theta$, through a metal film perforated with an array of apertures, wherein one of the two surfaces includes a periodic surface topography similar to that shown in FIGS. 1 and 2.

It can be seen in FIG. 9 that in the apertures and dimples case, the transmission peaks corresponding to P(air-side surface)=1 $\mu$m (labeled "A1.0 $\mu$m") disappear in comparison to the apertures-only case, and that the P(air-side surface)= 0.5 $\mu$m transmission peak (labeled "(1,0)A0.5 $\mu$m") becomes significantly more intense. This is because, with the dimples present, the air-metal surface is characterized by a periodic square array of depressions (whether apertures or dimples) with P=0.5 $\mu$m. Moreover, the transmission of the aperture array alone, which is already enhanced compared to single apertures not in an array, is even more strongly enhanced when the incident light is resonant with surface plasmon modes associated with the dimples. This is clearly apparent in the graphs of FIGS. 8A and 8B, as well as in the (E, $k_x$) dispersion diagrams of FIGS. 10A and 10B, which compare perforated metal film samples without surface features (FIGS. 8A and 10A) to perforated metal film samples having dimple-shaped surface features (FIGS. 8B and 10B). The bright bands in FIG. 10B which are not present in FIG. 10A correspond to surface plasmon modes of the P=0.5 $\mu$m dimple array, showing that the presence of the periodic surface topography further enhances the light transmission.

Figure 11:
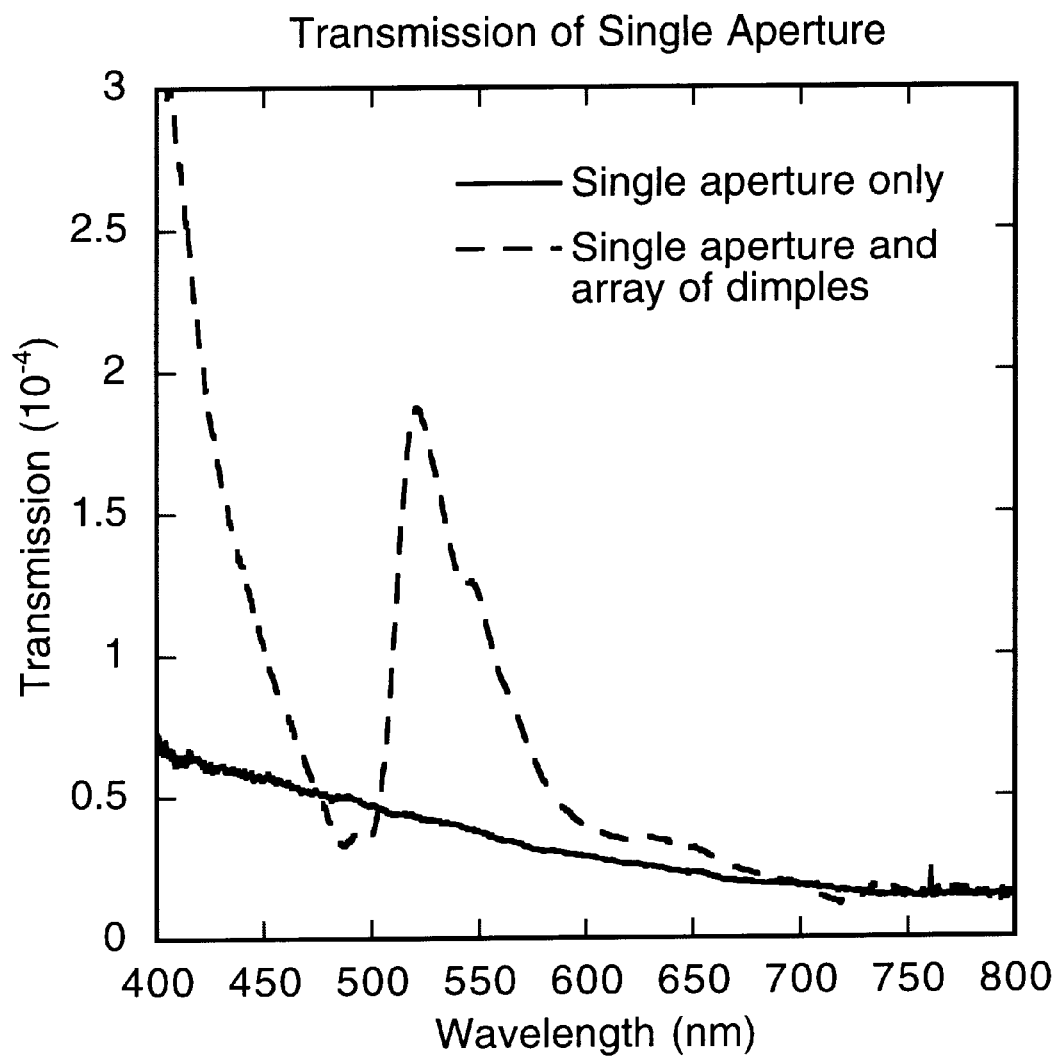
FIG. 11 is a graph showing the zero-order transmission of two metal films each having a single aperture, one metal film having nominally smooth surfaces and the other metal film being provided with a surface having a periodic surface topography with a period P=0.5 $\mu$m.

This remarkable transmission enhancement occurs not only for large arrays of apertures but also in the case of small numbers of apertures or even a single aperture. FIG. 11 is a graph comparing the typical zero-order transmission spectrum of a single aperture in a metal film provided with a periodic surface topography comprising dimple-shaped surface features having a period of P=0.5 $\mu$m (such as the enhanced light transmission apparatus embodiment illustrated in FIG. 3), with that of a single aperture in a smooth metal film which does not have a periodic surface topography. The single aperture in the periodically structured surface case exhibits transmission maxima and minima expected for the period of the surface features (see Ghaemi et al., supra) and at the transmission maxima strong transmission enhancement is observed as compared to the single aperture in the smooth metal film.

Figure 12:
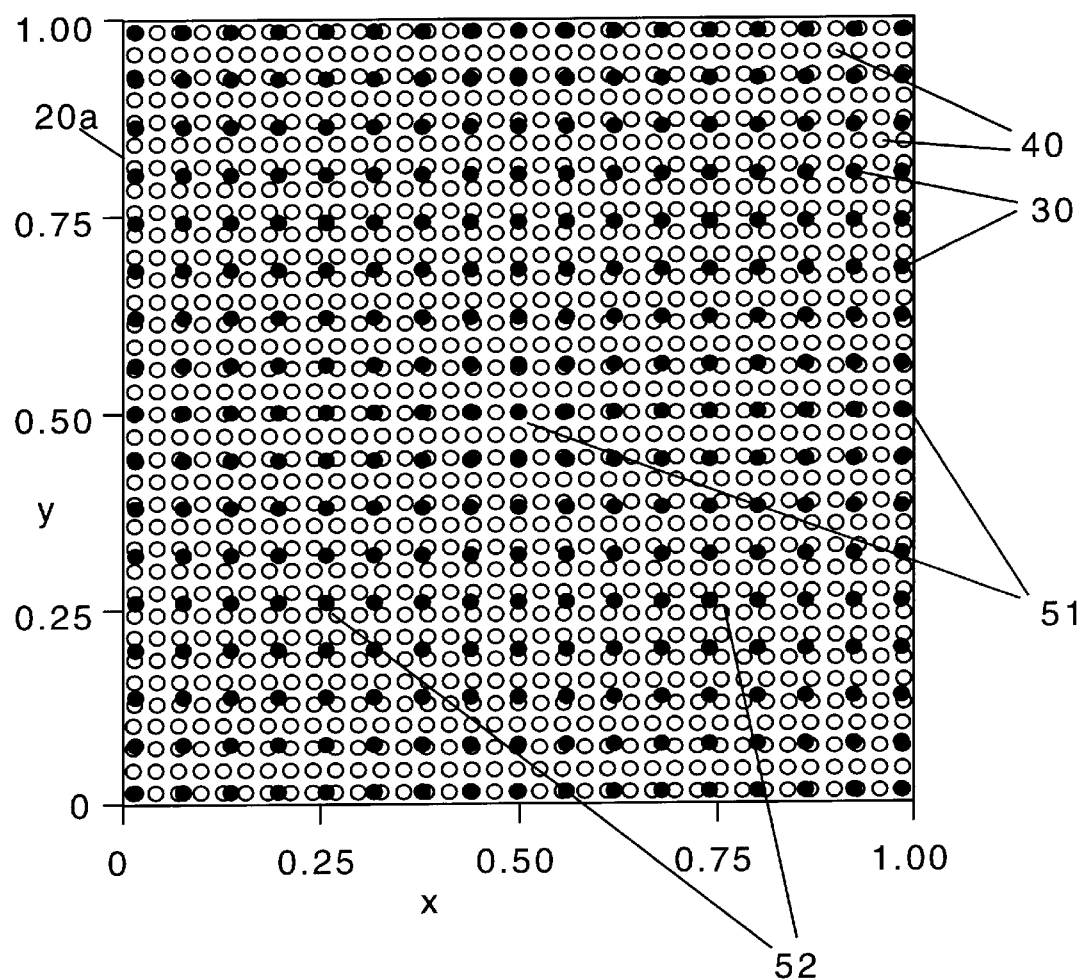
FIG. 12 is a plan view of a metal film having an array of apertures and a periodic surface topography, in which the surface features comprising the periodic surface topography have a period P=0.5 $\mu$m and the array of apertures have a period of 1.06 $\mu$m, such that the array of periodic surface features and the array of apertures are positionally incommensurate.

In the examples of FIGS. 9 and 11, the aperture(s) are placed in register with the surface features (e.g. the dimples) as shown in FIG. 2A, for example. Specifically, the apertures and the surface features are positionally commensurate and positionally in phase: that is, the apertures are positioned at sites which would otherwise be occupied by surface features (positionally in phase) and the ratio of the period of the apertures to the period of the surface features is a simple integer (positionally commensurate). If the ratio of the period of the apertures to the period of the surface features is a simple integer but the apertures are not positioned at sites which would otherwise be occupied by surface features, then the aperture array is commensurate with the surface feature array but the two arrays are not in phase. If the ratio of the period of the apertures to the period of the surface features is not a simple integer, then the aperture array and the surface feature array are positionally incommensurate as illustrated in FIG. 12. In a positionally incommensurate structure, the high transmission afforded by the invention only occurs at such locations where the two periodic structures are close to being in phase (such as at positions 51 in FIG. 12), and the transmission is not enhanced or lower where the two arrays are out of phase (such as at positions 52 in FIG. 12). This is demonstrated in FIG. 13, which is a wire diagram showing the spatial distribution of light emerging from the positionally incommensurate structure of FIG. 12 when illuminated uniformly with white light.

Figure 14:
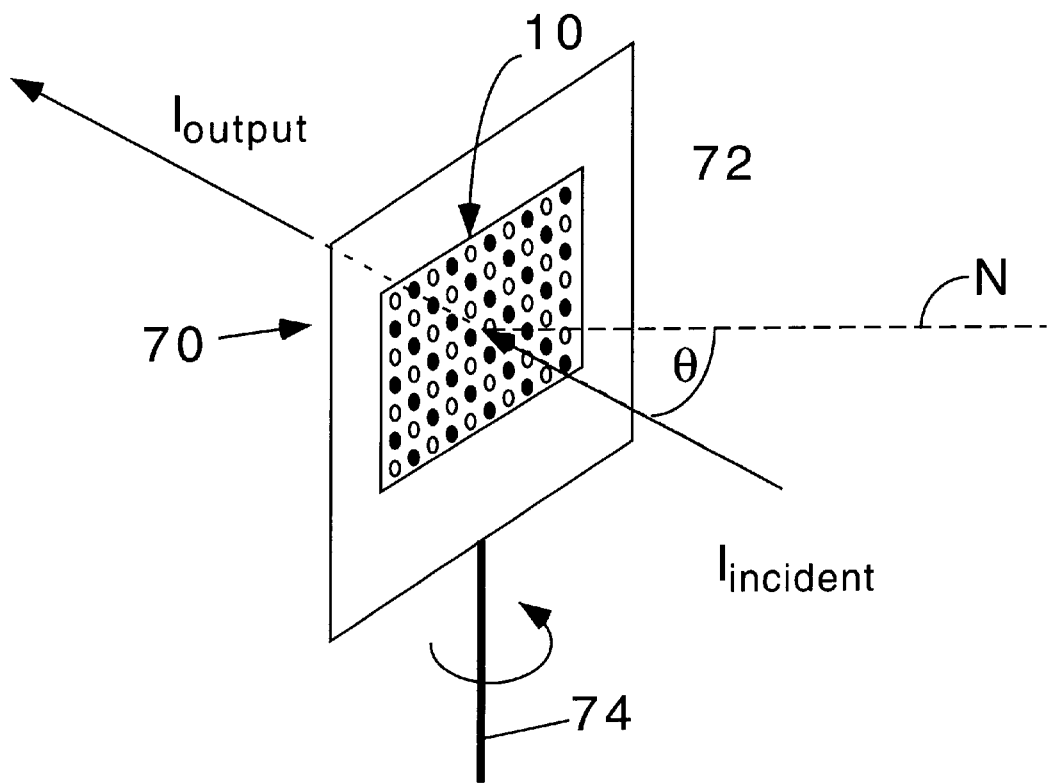
FIG. 14 is a perspective, schematic diagram illustrating an apparatus which selectively varies the transmission of light therethrough by changing the incident angle of the light, such a device being effective as a wavelength-selective optical filter.

As discussed above, the enhanced transmission spectra of a metal film having one or more apertures and at least one surface exhibiting a periodic surface topography are dependent upon the angle of the light incident upon the surface. This angular dependence effect results in a novel wavelength-selective optical filter 70 as shown in FIG. 14. An enhanced light transmission apparatus 10, constructed as described above, is preferably mounted to a support 72, such as a substrate, and the support is preferably mounted to a rotatable axle 74. The surface features comprising the periodic surface topography of enhanced light transmission apparatus 10 are preferably commensurate and in phase with the periodic apertures. Dashed line N represents a line normal to the surface of optical filter 70, and the angle of light incident on the optical filter 70 is denoted by angle $\theta$ with respect to the normal N. By rotatably adjusting the optical filter 70, and hence changing the angle of incidence $\theta$, the wavelength at which the light transmission peaks as a function of the angle is selectively variable as shown in FIGS. 8 and 10. By using this property, an optical filter comprising a metal film with one or more apertures and having at least one surface with a periodic surface topography, adjustable to obtain a predetermined incidence angle, can be formed. As the incidence angle of the filter is varied, the wavelengths of light transmitted through the filter are also varied and are selectable based on the selected incidence angle.

This wavelength-selective optical filter can be used for ultraviolet, visible and longer wavelengths. The advantage of this arrangement is that the output light is colinear with the input light, thereby obviating the need to redirect the optical beam, in contrast to attenuated total reflection devices (see H. Raether, supra). In addition, the periodic surface topography is a clearly distinguishing structural departure from the prior art. In particular, infrared and microwave mesh devices of the prior art include apertures alone, while the present invention features the combination of apertures and a periodic surface topography.

Figure 13:
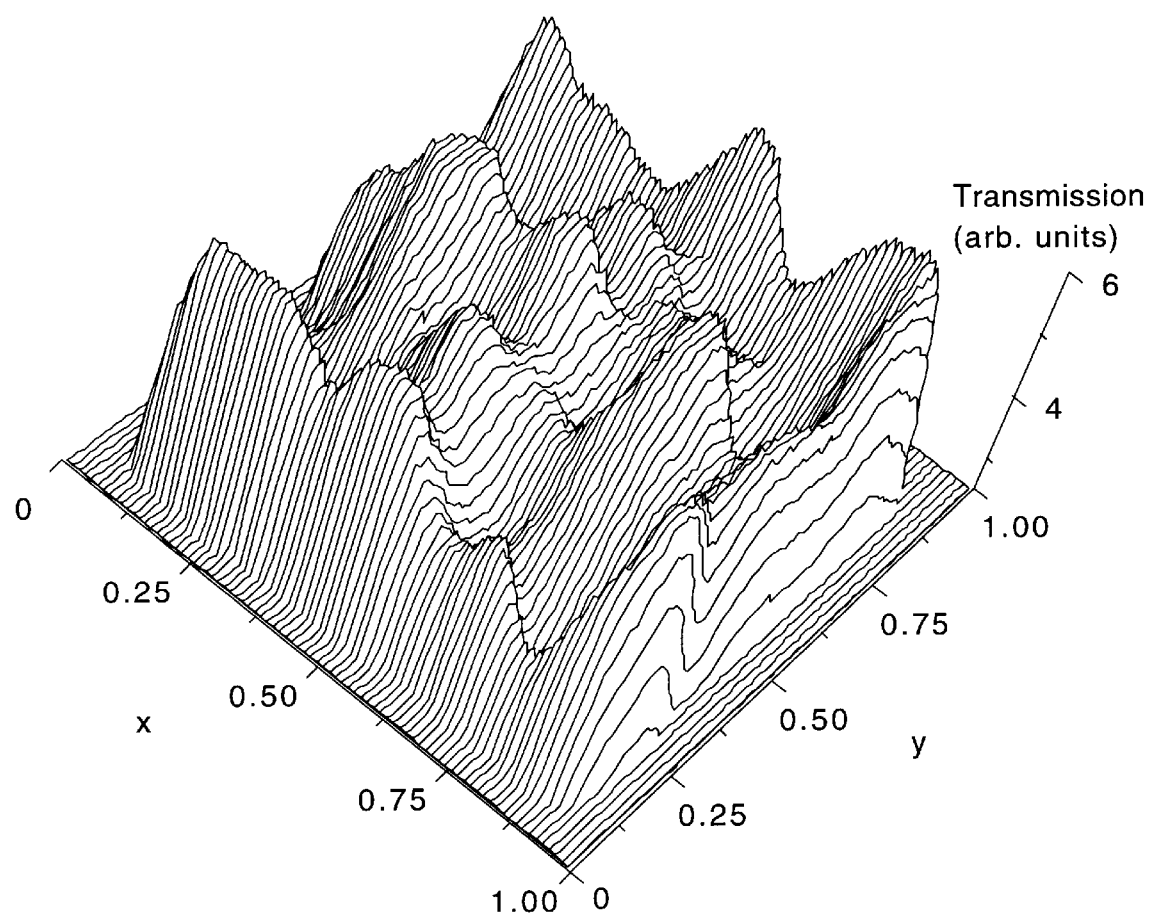
FIG. 13 is a wire diagram showing the spatial distribution of zero-order white light transmitted through the structure shown in FIG. 12.

Another optical filter variation afforded by the present invention is a spatial optical filter. A spatial optical filter is a filter which enables variation of the wavelength and/or intensity of transmitted light at selected positions along the surface space of the filter. A spatial optical filter of the present invention utilizes an enhanced light transmission apparatus 10 as described above, wherein the periodic surface features comprising the periodic surface topography are incommensurate and/or out of phase with the periodic apertures. By varying the commensurability and/or the phase difference between the surface features and the apertures, the wavelength and/or intensity of transmitted light transmitted through the filter at any given position can be controlled as shown in FIGS. 12 and 13. For example, the periodically arranged surface features may be positioned on the metal film so as to be either in or out of phase with the periodically arranged apertures at any given position. In this arrangement, enhanced transmission will occur through apertures where the surface features (that is, the periodic surface topography) are in phase with the periodically arranged apertures, and enhanced transmission will not occur through apertures where the surface features are not in phase with the periodically arranged apertures. The spatial optical filter of the present invention can be fixedly mounted or, if it is desired to combine the effects of the incommensurate and/or out-of phase arrays with angular transmission dependence, the spatial optical filter can be rotatably mounted as shown in FIG. 14.

The enhanced light transmission apparatus of the present invention, having both one or more apertures and at least one surface with a periodic surface topography, exhibit improved wavelength selectivity as optical filters in comparison to conventional mesh arrays (that is, sparse meshes or wire arrays used as filters in the infrared or microwave regions; see R. Ulrich, "Far-Infrared Properties Of Metallic Mesh And Its Complimentary Structure," *Infrared Physics*, Vol. 7, pp. 37–55 (1967), and L. C. Botten et al., "Inductive Grids In The Resonant Region: Theory And Experiment," *International Journal of Infrared and Millimeter Waves*, Vol. 6, No. 7, pp. 511–575 (1985)). Moreover, unlike photonic band gap arrays where the material is passive and translucent at all wavelengths except at the energies within the gap, the present invention provides a material that is opaque at all wavelengths except those for which coupling occurs.

Figure 15A:
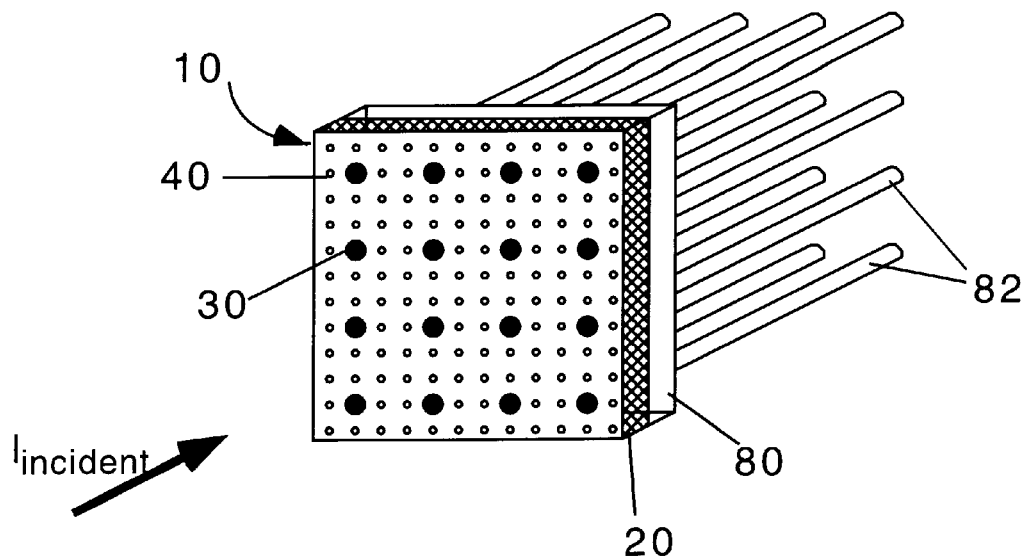
FIGS. 15A and 15B are perspective, schematic diagrams of light collectors of the present invention.
Figure 15B:
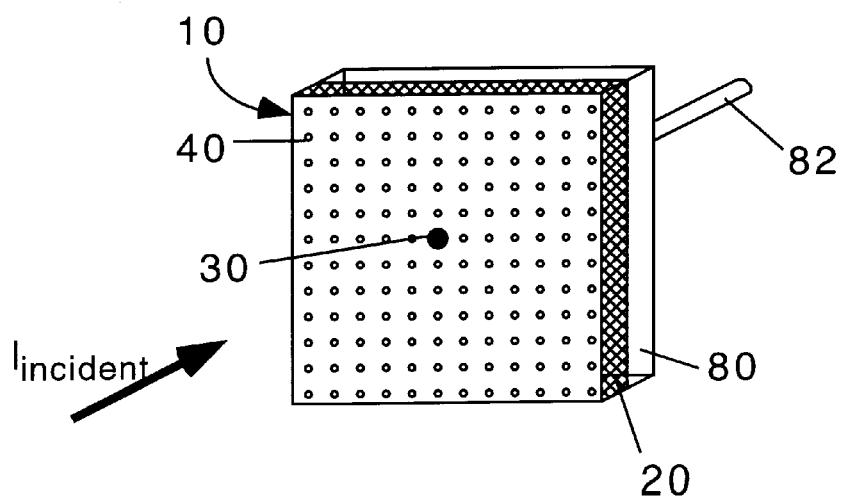

Another application of the invention is as a light beam collector as shown in FIGS. 15A and 15B. Light (indicated by the arrow labeled $I_{incident}$) is incident on an enhanced light transmission apparatus 10. The enhanced light transmission apparatus 10 includes a metal film 20 deposited on a substrate 80. As shown in FIG. 15A, metal film 20 is provided with a plurality of apertures 30, and the metal film 20 has periodically arranged surface features 40 provided on at least one surface thereof. After coupling with the periodic surface features 40, the collected light travels through the plurality of apertures 30 to corresponding optic fibers 82 which are provided in communication with, and preferably as close as possible to, the apertures. Alternatively, a single aperture may be provided in the metal film as shown in FIG. 15B, wherein a single optic fiber 82 is provided in communication with the single aperture 30 for collecting light for transmission into one optic fiber.

In the light collectors of FIGS. 15A and 15B, the intensity of the light passing through the apertures 30 and entering into the fibers 82 is enhanced by the enhanced light transmission apparatus 10 of the present invention as described above. The aspect ratio of the apertures 30 is not critical, but the periodicity of the surface features 40 is important for determining the wavelength of the enhanced light collection as described above (see Eqs. (3) and (4) above, for example). Previously, it was difficult to direct light into subwavelength fibers. Complex lenses and alignment devices were used to direct the light. Since in the present invention the apertures transmit more light than the aperture surface area, the metal aperture and surface feature array acts like a light collector. As a result, coupling light into fibers (including subwavelength fibers if the apertures are of subwavelength diameter) is made efficient. Indeed, the light collector of the present invention is even more efficient than light collectors utilizing "aperture-only" arrays as opposed to the combination of one or more apertures and periodic surface features as used in the present invention.

Another application for the structure surface with a single aperture is in near-field scanning optical microscopy ("NSOM"). FIGS. 16A–16C illustrate near-field scanning optical microscope probes constructed according to the present invention. As shown in FIGS. 16A and 16B, a light source 90 transmits light through a specimen 92 supported by a support (not shown) into a probe 100 which acts as a light collector. The probe 100 is a light conveying device which includes a frontal surface 102. A metal film 104, corresponding to the metal film 20 utilized in the enhanced light transmission apparatus 10 described above, is fixed to the frontal surface 102 of the probe, by deposition, for example. The metal film 104 includes a single, subwavelength-diameter aperture 106 and an array of surface features 108, such as dimples, for enhancing the intensity of the light collected by the probe. The collected light is directed through the probe as shown by the arrow in FIG. 16A for subsequent conventional NSOM signal processing. It should be noted that the periodic surface topography may be provided either on the side of the metal film 104 facing the sample or on the side of the metal film opposite the sample and adjacent the frontal surface 102 of the probe 100.

FIG. 16C shows an alternative embodiment of the near-field scanning optical microscope probe of the present invention, in which the probe acts as a light source (emission mode) instead of a light collector (collection mode). The construction of the probe is similar to that shown in FIGS. 16A–B. Light is directed into the probe 100 toward the frontal surface 102 as shown by the arrow in FIG. 16C. The light couples with the periodic array of surface features 108, such as dimples, on the exposed surface of the metal film 104. The light is then transmitted via the single subwavelength-diameter aperture 106 in the frontal surface 102, through the specimen 92, to a photodetector 94 for conventional signal processing. The inclusion of at least two surface features 108 in the metal film 104 on the frontal surface 102 of probe 100 enhances the intensity of light transmitted from the probe 100 into the specimen 92 for subsequent collection at photodetector 94.

The resolution of the NSOM is determined by the size of the aperture, so the smaller the aperture the better the resolution. However, in practice there is a practical limit to the resolution achievable because the transmission of a subwavelength-diameter aperture decreases as $(d/\lambda)^4$ as discussed above, which results in very low intensity signals. Therefore, as the aperture is made smaller to achieve finer resolution, the enhanced light transmission offered by the single subwavelength-diameter aperture NSOM probe of the present invention (in combination with the periodic surface topography) becomes increasingly advantageous as compared to conventional NSOM apertures since, in the present invention, the light transmission depends linearly on the surface area of the aperture and the wavelength is determined only by the period and symmetries of the surface features surrounding the aperture. In other words, the NSOM probe of the present invention is not hampered by (d/λ$^4$) dependence.

Figure 17A:
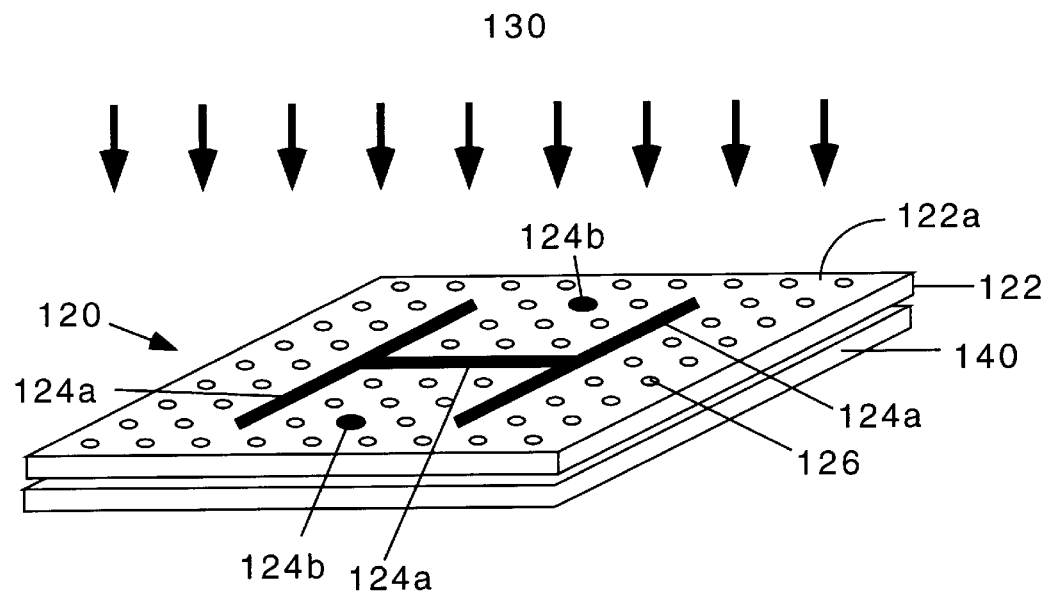
FIG. 17A is a perspective, schematic diagram showing an enhanced light transmission apparatus of the present invention utilized as a photolithographic mask according to the present invention.
Figure 17B:
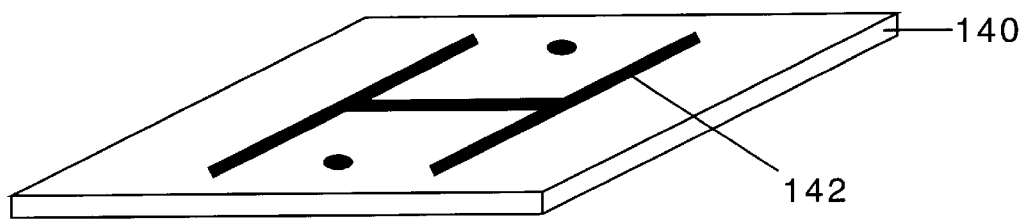
FIG. 17B is a perspective, schematic diagram showing a resulting pattern transferred onto a substrate with a photosensitive coating using the photolithographic mask of the present invention.

In another application of the invention shown in FIGS. 17A and 17B, the enhanced light transmission apparatus of the present invention with a single or several apertures can be used to make novel masks for subwavelength photolithography by virtue of the arrangement of the periodic surface features and the apertures in the metallic mask. The mask 120 comprises a metal film 122, which may be deposited on a substrate (not shown), having one or more apertures 124 provided therein. A plurality of periodically arranged surface features 126, such as dimples, are also provided on a first surface 122a of metal film 122 so as to provide a periodic surface topography on first surface 122a of metal film 122. Incident light 130, having a wavelength λ which is much greater than the diameter of the apertures 124, is directed at first surface 122a of the mask 120. Incident light 130 couples with the periodic surface topography and is projected through the apertures 124 in metal film 122 to yield lithographed images having features much smaller than (λ/2).

To illustrate the lithographic operation of the invention, the transfer of the letter "H" and two dots onto a substrate 140 coated with photosensitive material is shown in FIG. 17A and 17B. Slit-shaped apertures 124a are fabricated in the metal film 122 in an arrangement corresponding to the image to be transferred (in this case, the letter "H"). In addition, round or "dot-shaped" apertures 124b are also provided to provide the two dots in the image. Light 130 is directed at the mask 120, whereupon the light is transmitted through the apertures 124a and 124b with enhanced transmission effect due to the periodic surface topography afforded by the surface features 126 as described above. As a result, the photoresist-coated substrate 140 is exposed in the pattern of the desired image 142.

The photolithographic masks of the present invention allow subwavelength-width points or lines to be written onto photosensitive material without using deep-UV and X-ray sources. Instead, regular UV light sources, or even visible light sources, may be used. In addition, the present invention permits the use of conventional photoresists, such as UV-sensitive or visible light-sensitive photoresists, instead of X-ray sensitive photoresists.

While there has been described and illustrated various enhanced light transmission apparatus for use in certain applications, it will be apparent to those skilled in the art that variations and modifications are possible without deviating from the spirit and broad teachings of the invention which shall be limited solely by the scope of the claims appended hereto.

What is claimed is:

1. An apparatus for enhanced light transmission comprising:
    a metal film having a first surface and a second surface;
    at least one aperture provided in the metal film and extending from the first surface to the second surface; and
    a periodic surface topography provided on at least one of the first and second surface of the metal film, whereby light incident on one of the surfaces of the metal film interacts with a surface plasmon mode on at least one of the surfaces of the metal film thereby enhancing transmission of light through the at least one aperture in the metal film.

2. The apparatus for enhanced light transmission of claim 1, wherein the metal film is fixed to a substrate.

3. The apparatus for enhanced light transmission of claim 1, wherein the periodic surface topography comprises a plurality of surface features.

4. The apparatus for enhanced light transmission of claim 3, wherein the surface features comprise dimples.

5. The apparatus for enhanced light transmission of claim 3, wherein the surface features comprise semi-spherical protrusions.

6. The apparatus for enhanced light transmission of claim 3, wherein the surface features comprise grooves.

7. The apparatus for enhanced light transmission of claim 3, wherein the surface features comprise ribs.

8. The apparatus for enhanced light transmission of claim 3, wherein the surface features comprise concentric depressed rings.

9. The apparatus for enhanced light transmission of claim 3, wherein the surface features comprise concentric raised rings.

10. The apparatus for enhanced light transmission of claim 1, wherein the at least one aperture comprises a single aperture.

11. The apparatus for enhanced light transmission of claim 1, wherein the at least one aperture comprises a plurality of apertures.

12. The apparatus for enhanced light transmission of claim 1, wherein the plurality of apertures are periodically arranged, wherein the periodic surface topography comprises a plurality of surface features, and wherein the periodic apertures and the periodic surface features are positionally commensurate and in phase.

13. The apparatus for enhanced light transmission of claim 1, wherein the apertures are cylindrically shaped.

14. The apparatus for enhanced light transmission of claim 1, wherein the apertures are slit-shaped.

15. The apparatus for enhanced light transmission of claim 1, wherein the apertures are rectangularly-shaped.

16. The apparatus for enhanced light transmission of claim 1, wherein the light is incident on a surface of the metal film having the periodic surface topography provided thereon.

17. An apparatus for enhanced light transmission comprising:
    a metal film having a first surface and a second surface;
    a single aperture provided in the metal film and extending from the first surface to the second surface; and
    a periodic surface topography provided on at least one of the first and second surface of the metal film, whereby light incident on one of the surfaces of the metal film interacts with a surface plasmon mode on at least one of the surfaces of the metal film thereby enhancing transmission of light through the aperture in the metal film.

18. The apparatus for enhanced light transmission of claim 17, wherein the metal film is fixed to a substrate.

19. The apparatus for enhanced light transmission of claim 17, wherein the periodic surface topography comprises a plurality of surface features.

20. The apparatus for enhanced light transmission of claim 19, wherein the surface features comprise dimples.

21. The apparatus for enhanced light transmission of claim 19, wherein the surface features comprise semi-spherical protrusions.

22. The apparatus for enhanced light transmission of claim 19, wherein the surface features comprise grooves.

23. The apparatus for enhanced light transmission of claim 19, wherein the surface features comprise ribs.

24. The apparatus for enhanced light transmission of claim 19, wherein the surface features comprise concentric depressed rings.

25. The apparatus for enhanced light transmission of claim 19, wherein the surface features comprise concentric raised rings.

26. The apparatus for enhanced light transmission of claim 17, wherein the apertures are cylindrically shaped.

27. The apparatus for enhanced light transmission of claim 17, wherein the apertures are slit-shaped.

28. The apparatus for enhanced light transmission of claim 17, wherein the apertures are rectangularly-shaped.

29. The apparatus for enhanced light transmission of claim 17, wherein the light is incident on a surface of the metal film having the periodic surface topography provided thereon.

30. An optical filter comprising:
a metal film having a first surface and a second surface;
at least one aperture provided in the metal film and extending from the first surface to the second surface;
a periodic surface topography provided on at least one of the first and second surface of the metal film, whereby light incident on one of the surfaces of the metal film interacts with a surface plasmon mode on at least one of the surfaces of the metal film thereby enhancing transmission of light through the at least one aperture in the metal film; and
means for adjusting the orientation of the metal film with respect to light incident thereon, such that only light of a specific range of wavelengths is transmitted through the apertures in the metal film.

31. The optical filter of claim 30, wherein the at least one aperture comprises a single aperture.

32. The optical filter of claim 30, wherein the at least one aperture comprises a plurality of apertures.

33. The optical filter of claim 32, wherein the plurality of apertures are periodically arranged, wherein the periodic surface topography comprises a plurality of surface features, and wherein the periodic apertures and the periodic surface features are positionally commensurate and in phase.

34. The optical filter of claim 30, wherein the light is incident on a surface of the metal film having the periodic surface topography provided thereon.

35. A spatial optical filter comprising:
a metal film having a first surface and a second surface;
a plurality of periodically arranged apertures provided in the metal film and extending from the first surface to the second surface; and
a periodic surface topography provided on at least one of the first and second surface of the metal film, the periodic surface topography being in phase with the periodically arranged apertures at first positions on the metal film where enhanced transmission is desired and out of phase with the periodically arranged apertures at second positions on the metal film where enhanced transmission is not desired, whereby light incident on one of the surfaces of the metal film interacts with a surface plasmon mode on at least one of the surfaces of the metal film thereby enhancing transmission of light through apertures at the first positions in the metal film and not enhancing transmission of light through apertures at the second positions in the metal.

36. The spatial optical filter of claim 35, wherein the light is incident on a surface of the metal film having the periodic surface topography provided thereon.

37. The spatial optical filter of claim 35, further comprising means for adjusting the orientation of the metal film with respect to light incident thereon, such that only light of a specific range of wavelengths is transmitted through the apertures in the metal film.

38. A light collector comprising:
a metal film having a first surface and a second surface;
at least one aperture provided in the metal film and extending from the first surface to the second surface;
a periodic surface topography provided on at least one of the first and second surface of the metal film, whereby light incident on one of the surfaces of the metal film interacts with a surface plasmon mode on at least one of the surfaces of the metal film thereby enhancing transmission of light through the at least one aperture in the metal film; and
an optic fiber disposed in communication with each aperture such that light traveling through each aperture enters a corresponding optic fiber.

39. The light collector of claim 38, wherein the at least one aperture comprises a single aperture.

40. The light collector of claim 38, wherein the at least one aperture comprises a plurality of apertures.

41. The light collector of claim 40, wherein the plurality of apertures are periodically arranged, wherein the periodic surface topography comprises a plurality of surface features, and wherein the periodic apertures and the periodic surface features are positionally commensurate and in phase.

42. The light collector of claim 38, wherein the light is incident on a surface of the metal film having the periodic surface topography provided thereon.

43. A near-field scanning optical microscope probe for use in a collection mode in a near-field scanning optical microscope including a light source and a photodetector, the near-field scanning optical microscope probe comprising:
a light conveying device having a frontal surface disposed in proximity to the light source for receiving light from the light source;
a metal film disposed on the frontal surface, the metal film having a first surface fixed to the frontal surface of the light conveying device frontal surface, and the metal film having a second surface facing the light source;
at least one aperture provided in the metal film and extending from the first surface to the second surface; and
a periodic surface topography provided on at least one of the first and second surfaces of the metal film, whereby light from the light source incident on the second surface of the metal film interacts with a surface plasmon mode on at least one of the surfaces of the metal film thereby enhancing transmission of light through the at least one aperture in the metal film, such that the enhanced transmitted light is conveyed through the light conveying device to the photodetector.

44. The near-field scanning optical microscope probe of claim 43, wherein the at least one aperture comprises a single aperture.

45. The near-field scanning optical microscope probe of claim 43, wherein the at least one aperture comprises a plurality of apertures.

46. The near-field scanning optical microscope probe of claim 45, wherein the plurality of apertures are periodically arranged, wherein the periodic surface topography comprises a plurality of surface features, and wherein the periodic apertures and the periodic surface features are positionally commensurate and in phase.

47. The near-field scanning optical microscope probe of claim 43, wherein the second surface of the metal film has the periodic surface topography provided thereon.

48. A near-field scanning optical microscope probe for use in an emission mode in a near-field scanning optical microscope including a light source and a photodetector, the near-field scanning optical microscope probe comprising:

a light conveying device having a frontal surface disposed in proximity to the photodetector for transmitting light to the photodetector;

a metal film disposed on the frontal surface, the metal film having a first surface fixed to the frontal surface of the light conveying device frontal surface, and the metal film having a second surface facing the photodetector;

at least one aperture provided in the metal film and extending from the first surface to the second surface; and a periodic surface topography provided on at least one of the first and second surfaces of the metal film, whereby light from the light source will be conveyed through the light conveying device to the frontal surface and is incident on the first surface of the metal film so as to interact with a surface plasmon mode on at least one of the surfaces of the metal film thereby enhancing transmission of the light through the at least one aperture in the metal film, such that the enhanced transmitted light is transmitted to the photodetector.

49. The near-field scanning optical microscope probe of claim 48, wherein the at least one aperture comprises a single aperture.

50. The near-field scanning optical microscope probe of claim 48, wherein the at least one aperture comprises a plurality of apertures.

51. The near-field scanning optical microscope probe of claim 50, wherein the plurality of apertures are periodically arranged, wherein the periodic surface topography comprises a plurality of surface features, and wherein the periodic apertures and the periodic surface features are positionally commensurate and in phase.

52. The near-field scanning optical microscope probe of claim 50, wherein the first surface of the metal film has the periodic surface topography provided thereon.

53. A photolithographic mask for transferring an image to a photoresist-coated substrate, the mask comprising:

a metal film having a first surface and a second surface;

at least one aperture provided in the metal film and extending from the first surface to the second surface, the at least one aperture being disposed in a pattern corresponding to the image to be transferred; and a periodic surface topography provided on at least one of the first and second surface of the metal film, whereby light incident on one of the surfaces of the metal film interacts with a surface plasmon mode on at least one of the surfaces of the metal film thereby enhancing transmission of light through the at least one aperture in the metal film so as to expose the photoresist-coated substrate according to the pattern in the metal film, thereby transferring the image.

54. The photolithographic mask of claim 53, wherein the at least one aperture comprises a single aperture.

55. The photolithographic mask of claim 53, wherein the at least one aperture comprises a plurality of apertures.

56. The photolithographic mask of claim 55, wherein the plurality of apertures are periodically arranged, wherein the periodic surface topography comprises a plurality of surface features, and wherein the periodic apertures and the periodic surface features are positionally commensurate and in phase.

57. The photolithographic mask of claim 53, wherein the apertures are slit-shaped.

58. The photolithographic mask of claim 53, wherein the light is incident on a surface of the metal film having the periodic surface topography provided thereon.

* * * * *